(12) United States Patent
Marugame et al.

(10) Patent No.: US 11,595,545 B2
(45) Date of Patent: Feb. 28, 2023

(54) PRINTING SYSTEM AND PRINTING CONTROL APPARATUS

(71) Applicant: TOPPAN INC., Tokyo (JP)

(72) Inventors: Tomoyuki Marugame, Tokyo (JP); Masashi Kubota, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/554,027

(22) Filed: Dec. 17, 2021

(65) Prior Publication Data

US 2022/0109775 A1    Apr. 7, 2022

Related U.S. Application Data

(63) Continuation of application No. PCT/JP2019/024264, filed on Jun. 19, 2019.

(51) Int. Cl.
*H04N 1/32*    (2006.01)

(52) U.S. Cl.
CPC ..... *H04N 1/32229* (2013.01); *H04N 1/32352* (2013.01); *H04N 2201/3205* (2013.01)

(58) Field of Classification Search
CPC .................................................. H04N 1/32229
USPC ...................................................... 358/3.28
See application file for complete search history.

(56) References Cited

U.S. PATENT DOCUMENTS

2016/0332476 A1\* 11/2016 Inokuchi ................ B42D 25/24

FOREIGN PATENT DOCUMENTS

JP    2016-124249 A    7/2015

OTHER PUBLICATIONS

International Searching Authority, "International Search Report," issued in connection with International Patent Application No. PCT/JP2020/024264, dated Jul. 17, 2019, 5 pages.
International Searching Authority, "Written Opinion," issued in connection with International Patent Application No. PCT/JP2020/024264, dated Jul. 17, 2019, 4 pages.

\* cited by examiner

*Primary Examiner* — Jacky X Zheng
(74) *Attorney, Agent, or Firm* — Foley & Lardner LLP

(57) ABSTRACT

A printing system includes a first printing unit that performs printing using a material that exhibits structural color, based on first data, a second printing unit that performs printing using a material that includes pigment, based on second data, and a control apparatus that outputs the first data and the second data; the first data causes the first printing unit to print the first personal information items of a first information group in respective regions, and an item of identification information linked to the first information group; and the second data causes the second printing unit to print the second personal information items of a second information group linked to the item of identification information on the corresponding respective regions on which the first personal information items corresponding to the respective second personal information items have been printed.

8 Claims, 10 Drawing Sheets

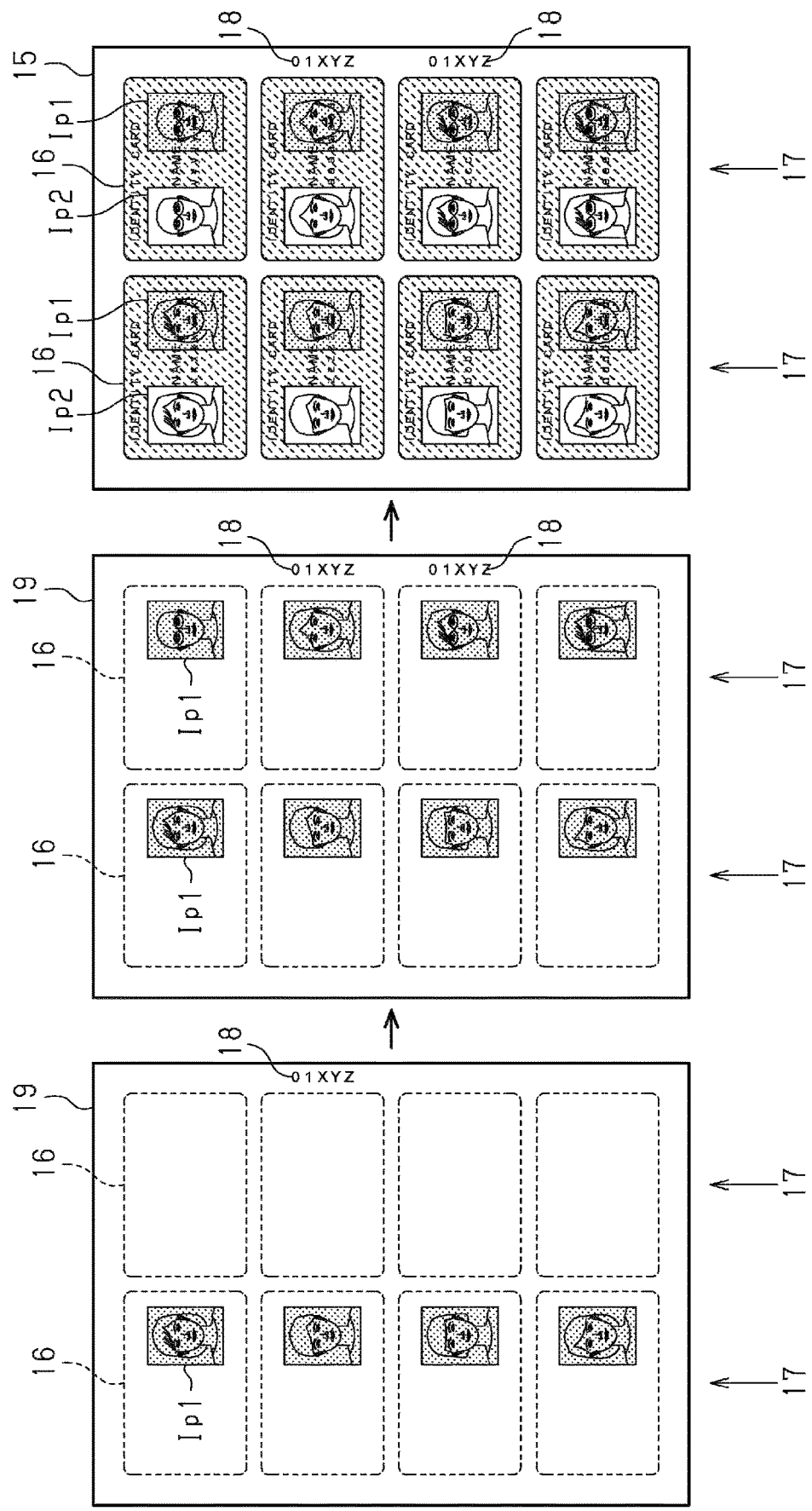

PRINTING SYSTEM AND PRINTING CONTROL APPARATUS

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/024264, filed on Jun. 19, 2019, the disclosure of which is incorporated herein by reference in its entirety.

TECHNICAL FIELD

The present invention relates to printing systems used to produce personal information media, and printing control apparatuses.

BACKGROUND

Background Art

A personal information medium such as an ID card has a region that displays personal information such as the name and facial image of the owner. In recent years, in order to prevent counterfeiting of personal information media, there has been proposed a medium provided with a colored region exhibiting color due to a pigment, and a structural color region exhibiting structural color, with the colored region and the structural color region each displaying personal information (see, for example, PTL 1). The structural color is a color that is observed due to an optical phenomenon such as diffraction or interference of light caused by the fine structure of an object, and the structural color region may be composed of, for example, a hologram.
[Citation List][Patent Literature][PTL 1] JP 2016-124279 A

SUMMARY OF THE INVENTION

Technical Problem

During production of the personal information medium described above, the personal information in the colored region and the personal information in the structural color region are printed in separate steps. For production of a legitimate personal information medium, the personal information in the colored region and the personal information in the structural color region need to be personal information of the same person. In other words, the items of personal information in the two regions need to be a predetermined combination of personal information. Therefore, upon completion of the printing of the two items of personal information, it is verified whether the combination of the personal information in the colored region and the personal information in the structural color region is correct. However, in such a production method, there is a risk that the items of personal information printed on the medium may not be in a predetermined combination.

An object of the present invention is to provide a printing system and a printing control apparatus which are capable of increasing the accuracy of combinations of printed personal information items.

Solution to Problem

A printing system that solves the above problem is a printing system for producing a media sheet, the media sheet having a plurality of medium regions, each of the medium regions corresponding to a different one of separate personal information media, each of the personal information media including a first personal information item and a second personal information item corresponding to each other. The printing system includes a first printing unit that performs printing using a material that exhibits structural color, based on first data, a second printing unit that performs printing using a material that includes pigment, based on second data, and a control apparatus that outputs the first data and the second data. The control apparatus includes a storage unit, a first data output section, an identification information processing section, and a second data output section. The storage unit stores first information groups and second information groups, each of the first information groups and a corresponding one of the second information groups being linked to an item of identification information, each of the first information groups consisting of all first personal information items to be included in the medium sheet, each of the second information groups consisting of all second personal information items to be included in the medium sheet, the storage unit being configured to make, for the respective personal information medium, a correspondence between a corresponding one of the first personal information items of each of the first information groups and a corresponding one of the second personal information items of a corresponding one of the second information groups. The first data output section outputs the first data to the first printing unit, the first data causing the first printing unit to: print the first personal information items in a selected one of the first information groups on the corresponding respective medium regions of the media sheet; and print the item of identification information linked to the selected one of the first information groups on a region of the media sheet except for the medium regions. The identification information processing section identifies one of the second information groups, the one of the second information groups being linked to the item of identification information read from the media sheet on which the printing based on the first data has been performed. The second data output section outputs the second data to the second printing unit, the second data causing the second printing unit to print the second personal information items included in the identified one of the second information groups on the corresponding respective medium regions on which the first personal information items corresponding to the respective second personal information items have been printed.

A printing system that solves the above problem is a printing system for producing a media sheet, the media sheet having a plurality of medium regions, each of the medium regions corresponding to a different one of separate personal information media, each of the personal information media including a first personal information item and a second personal information item corresponding to each other. The printing system includes a first printing unit that performs printing using a material that includes pigment, based on first data, a second printing unit that performs printing using a material that exhibits structural color, based on second data, and a control apparatus that outputs the first data and the second data The control apparatus includes a storage unit, a first data output section, an identification information processing section, and a second data output section. The storage unit stores first information groups and second information groups, each of the first information groups and a corresponding one of the second information groups being linked to an item of identification information, each of the first information groups consisting of all first personal information items to be included in the medium sheet, each of the second information groups consisting of all second personal information items to be included in the medium sheet, the storage unit being configured to make, for the respective personal information mediums, a correspondence between a corresponding one of the first personal information items of each of the first information groups and a corresponding one of the second personal information items of a corresponding one of the second information groups. The first data output section outputs the first data to the first printing unit, the first data causing the first printing unit to: print the first personal information items in a selected one of the first information groups on the corresponding respective medium regions of the media sheet; and print the item of identification information linked to the selected one of the first information groups on a region of the media sheet except for the medium regions. The identification information processing section identifies one of the second information groups, the one of the second information groups being linked to the item of identification information read from the media sheet on which the printing based on the first data has been performed. The second data output section outputs the second data to the second printing unit, the second data causing the second printing unit to print the second personal information items included in the identified one of the second information groups on the corresponding respective medium regions on which the first personal information items corresponding to the respective second personal information items have been printed.

A printing control apparatus that solves the above problem is an apparatus for controlling production of a media sheet, the media sheet having a plurality of medium regions, each of the medium regions corresponding to a different one of separate personal information media, each of the personal information media including a first personal information item and a second personal information item corresponding to each other. The printing control apparatus includes a storage unit, a first data output section, an identification information processing section, and a second data output section. The storage unit stores first information groups and second information groups, each of the first information groups and a corresponding one of the second information groups being linked to an item of identification information, each of the first information groups consisting of all first personal information items to be included in the medium sheet, each of the second information groups consisting of all second personal information items to be included in the medium sheet, the storage unit being configured to make, for the respective personal information mediums, a correspondence between a corresponding one of the first personal information items of each of the first information groups and a corresponding one of the second personal information items of a corresponding one of the second information groups. The first data output section outputs first data to a first printing unit that performs printing using a material that exhibits structural color, based on the first data, the first data causing the first printing unit to: print the first personal information items in a selected one of the first information groups on the corresponding respective medium regions of the media sheet; and print the item of identification information linked to the selected one of the first information groups on a region of the media sheet except for the medium regions. The identification information processing section identifies one of the second information groups, the one of the second information groups being linked to the item of identification information read from the media sheet on which the printing based on the first data has been performed. The second data output section outputs second data to a second printing unit that performs printing using a material that includes pigment, based on the second data, the second data causing the second printing unit to print the second personal information items included in the identified one of the second information groups on the corresponding respective medium regions on which the first personal information items corresponding to the respective second personal information items have been printed.

According to the respective configurations above, in the control apparatus, each of the first information groups and a corresponding one of the second information groups for forming one media sheet are linked to the item of identification information, and the first personal information item and second personal information item constituting one personal information medium are linked to each other. Further, based on the read item of identification information printed together with the first information group, data is outputted for printing the second information group according to the combination of personal information items for each personal information medium. Therefore, the accuracy of combinations of printed personal information items can be increased.

In a form where one media sheet is used to collectively produce different personal information media, and personal information is printed twice, once by the first printing unit and once by the second printing unit, during production thereof, management of combinations of personal information is an important issue. According to the above configurations, in such a form, by linking the first information group and the second information group, which are printed separately, using the item of identification information, the combinations of personal information items are reliably managed; therefore, the accuracy of combinations of printed personal information items can be reliably increased.

In the above configurations, a reading unit may be further provided that receives the media sheet on which the first printing unit has printed, reads the item of identification information from the media sheet, and passes the media sheet to the second printing unit.

According to the above configuration, the reading unit is provided separately from the first printing unit and the second printing unit, which perform printing. This simplifies the configuration of a unit that performs printing, compared with the case where a reading unit that reads the item of identification information is provided in a unit that performs printing. Therefore, for example, the first printing unit and the second printing unit can be configured by making minor improvements to a conventionally used printing mechanism.

In the above configurations, the first printing unit may include a first head group and a second head group each comprised of one or more thermal head, and the first printing unit may be configured to, based on the first data: use the first head group to print at least one of the first personal information items included in the selected one of the first information groups and print the item of identification information linked to the selected one of the first information groups in a first position of the media sheet; and use the second head group to print a remainder of the first personal information items included in the selected one of the first information groups and print the item of identification information linked to the selected one of the first information groups in a second position of the media sheet, the first position of the media sheet being different from the second position of the media sheet.

According to the above configuration, printing first personal information items using the plurality of head groups can increase the number of sheet bodies printed per unit time by the first printing unit. Further, even in a form in which a plurality of first personal information items are separately printed by a plurality of head groups, by comparing the items of identification information printed by the head groups, it can be confirmed that the first personal information items printed on one sheet are first personal information items belonging to the same first information group, that is, first personal information items to be included in one media sheet.

The identification information processing section may be configured to determine whether the item of identification information printed by the first head group and the item of identification information printed by the second head group match each other, and the second data output section may be configured to output, to the second printing unit, the second data corresponding to the identified one of the second information groups in response to the identification information processing section determining that the item of identification information printed by the first head group and the item of identification information printed by the second head group match each other.

According to the above configuration, it can be confirmed that the first personal information items separately printed by the first head group and the second head group are first personal information items belonging to the same first information group. Since the second data is outputted after the confirmation, the accuracy in forming the media sheet can be improved.

In the above configurations, the identification information processing section may be configured to determine whether the selected one of the first information groups, which is linked to the read item of identification information, has been used for the first data outputted to the first printing unit, and the second data output section may be configured to output, to the second printing unit, the second data corresponding to the identified one of the second information groups in response to the identification information processing section determining that the selected one of the first information groups, which is linked to the read item of identification information, has been used for the first data outputted to the first printing unit.

According to the above configuration, it can be confirmed that the sheet targeted for reading of the item of identification information is a sheet that has been formed by the correct procedure, that is, a sheet on which the first personal information items have already been printed, and the second personal information items are to be printed next. Since the second data is outputted after the confirmation, the accuracy in forming the media sheet can be improved.

In the configurations above, the first personal information items and second personal information items may each include a facial image.

A personal information medium having such a combination of items of personal information has a strong anti-counterfeiting effect. Further, because the accuracy is improved in the combination of items of personal information printed when producing the personal information medium having a strong anti-counterfeiting effect, the printing system is highly useful.

Advantageous Effects of Invention

According to the present invention, the accuracy of combinations of printed personal information items can be increased.

BRIEF DESCRIPTION OF THE DRAWINGS

FIGS. 14(a), (b), and (c) illustrate a process of producing a media sheet produced by the printing system according to the embodiment.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

An embodiment of a printing system and a printing control apparatus will be described with reference to FIGS. 1 to 14.

[Personal Information Medium and Media Sheet]

Figure 1:
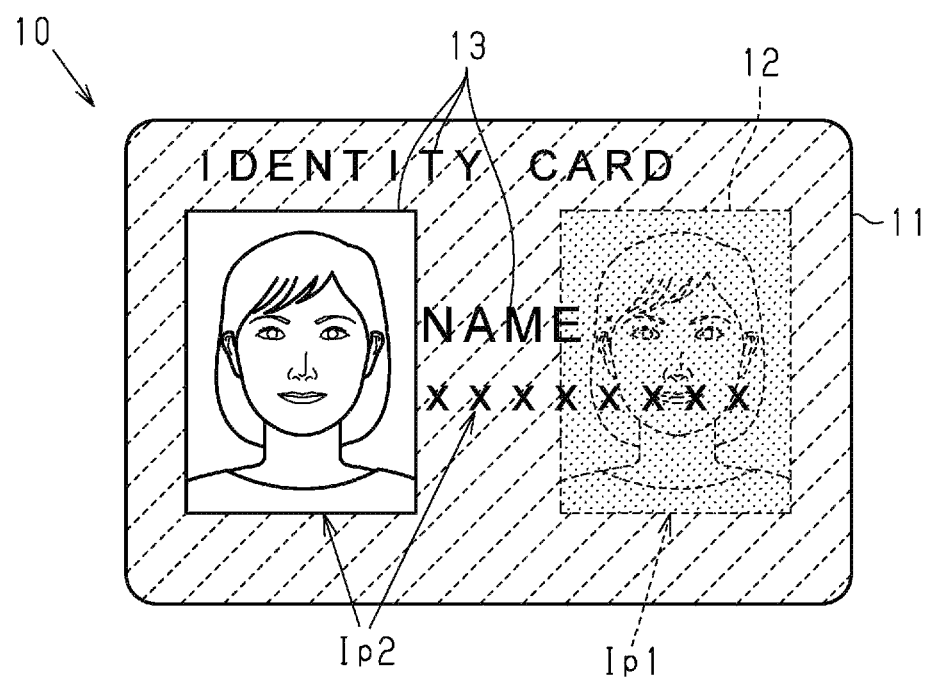
FIG. 1 illustrates a configuration of a personal information medium as a final product, according to an embodiment of a printing system.

The configuration of a personal information medium produced using the printing system of the present embodiment will be described with reference to FIG. 1. As shown in FIG. 1, a personal information medium 10 has a card shape. The personal information medium 10 may be embodied as, for example, an ID card or the like that proves the identity of the owner.

The personal information medium 10 includes a support 11, a structural color portion 12, and a pigmented portion 13. The structural color portion 12 and the pigmented portion 13 are located on the surface of the support 11. The structural color portion 12 exhibits structural color which is observed due to an optical phenomenon such as reflection, diffraction, or interference caused by the fine structure of an object. That is, the color observed in the structural color portion 12 changes depending on the observation angle. In an example of the present embodiment, the structural color portion 12 is a portion in which a hologram is formed. The structural color portion 12 is formed by thermal transfer printing.

The pigmented portion 13 exhibits color due to a pigment. That is, the color observed in the pigmented portion 13 is due to the absorption of light by a pigment. The pigmented portion 13 is formed by fixing toner or ink to the support 11 using a printing method.

The support 11 is made of a material capable of having the structural color portion 12 and the pigmented portion 13 formed on its surface. For example, the support 11 may be made of a resin such as polyethylene terephthalate.

The structural color portion 12 includes a portion displaying first personal information item Ip1, and the pigmented portion 13 includes a portion displaying second personal information item Ip2. That is, the personal information medium 10 includes a combination of a first personal information item Ip1 and a second personal information item Ip2. The first and second personal information items Ip1 and Ip2 are each personal information about the same person; specifically, the first and second personal information items Ip1 and Ip2 are each personal information about the person who will become the owner of the personal information medium 10. The personal information in the present embodiment is information that can be used for identifying an individual, such as a name, a date of birth, an address, and a facial image. In an example of the present embodiment, the first personal information item Ip1 and the second personal information item Ip2 each include a color facial image.

In addition to the portions displaying the personal information items Ip1 and Ip2, the structural color portion 12 and the pigmented portion 13 may each include portions displaying characters, symbols, designs, or patterns that display information different from the personal information. Furthermore, the personal information medium 10 may be provided with a layer which is different from the support 11, the structural color portion 12, and the pigmented portion 13, such as a protective layer covering the structural color portion 12 and the pigmented portion 13, or a layer for increasing the strength of the personal information medium 10.

Figure 2:
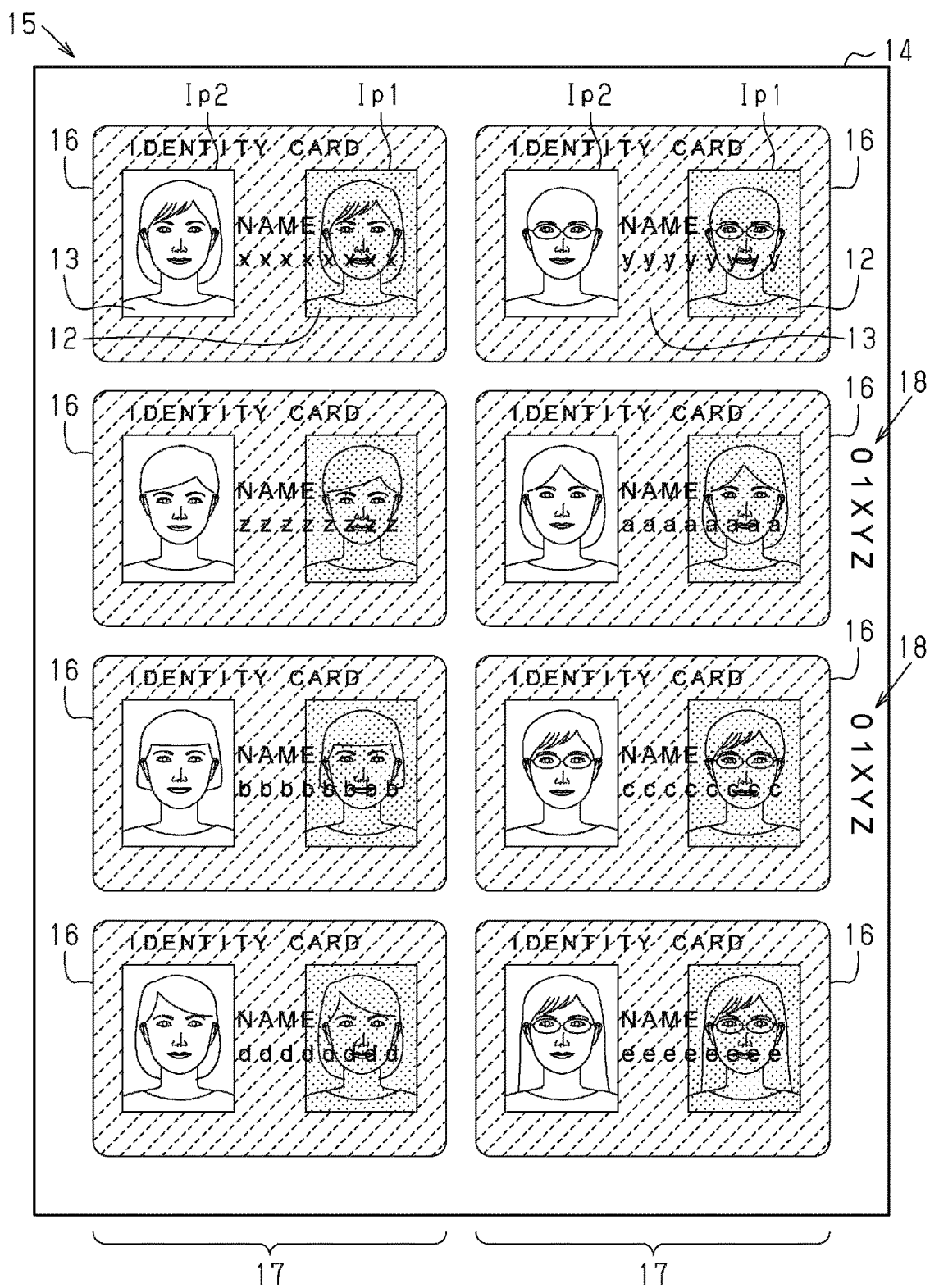
FIG. 2 illustrates a configuration of a media sheet to be produced by the printing system according to the embodiment.

FIG. 2 shows a media sheet produced by the printing system of the present embodiment. In the present embodiment, a plurality of personal information media 10 are produced using imposition. As shown in FIG. 2, a media sheet 15 has a plurality of medium regions 16. The medium regions 16 are regions that become the respective personal information media 10. That is, the plurality of medium regions 16 become personal information media 10 for different individuals.

Specifically, the media sheet 15 has one or more medium region rows 17. One medium region row 17 is composed of two or more medium regions 16. In an example of the present embodiment, the media sheet 15 has two medium region rows 17 each composed of four medium regions 16. That is, the media sheet 15 includes eight medium regions 16 arranged in two rows; personal information media 10 for eight people are formed from one media sheet 15.

The media sheet 15 is configured such that the structural color portions 12 and pigmented portions 13 for the respective corresponding personal information media 10, that is, the structural color portions 12 and pigmented portions 13 for the respective medium regions 16, are formed on a large substrate sheet 14 made of the material constituting the support 11. In the media sheet 15 produced, each medium region 16 includes first personal information items Ip1 and second personal information items Ip2. Each personal information medium 16 includes personal information items Ip1 and Ip2 about a different person.

The media sheet 15 includes two ID portions 18 outside the medium regions 16. Each ID portion 18 is a region in which an information group ID is printed. The information group ID is an item of identification information assigned to a group of first personal information items Ip1 and a group of second personal information items Ip2 included in one media sheet 15. In other words, a different information group ID is assigned to each combination of the personal information media 10 formed from one media sheet 15. The information group ID may be printed as, for example, a string of numbers or letters.

A first information group Gi1, which is a group of first personal information items Ip1, is composed of all the first personal information items Ip1 included in one media sheet 15. A second information group Gi2, which is a group of second personal information items Ip2, is composed of all the second personal information items Ip2 included in one media sheet 15. When the media sheet 15 has eight medium regions 16, the first information group Gi1 is composed of first personal information items Ip1 for eight different people, and the second information group Gi2 is composed of second personal information items Ip2 for the same eight different people.

The two ID portions 18 show the same information group ID. Each of the ID portions 18 is located alongside one of the medium regions 16 in one medium region row 17. In other words, each of the information group IDs is disposed alongside one of the medium regions 16 in a direction orthogonal to the direction in which the medium region rows 17 extend, that is, in a direction in which the medium region rows 17 are arranged in a row. The two ID portions 18 are arranged alongside different medium regions 16 of one medium region row 17. For example, in FIG. 2, one of the two ID portions 18 is located alongside the second medium region 16 from the top, and the other of the two ID portions 18 is located alongside the third medium region 16 from the top. The ID portions 18 may be located at an end of the media sheet 15 or at the central portion of the media sheet 15 as long as they are each positioned alongside a medium region 16.

[Schematic Configuration of Printing System]

Figure 3:
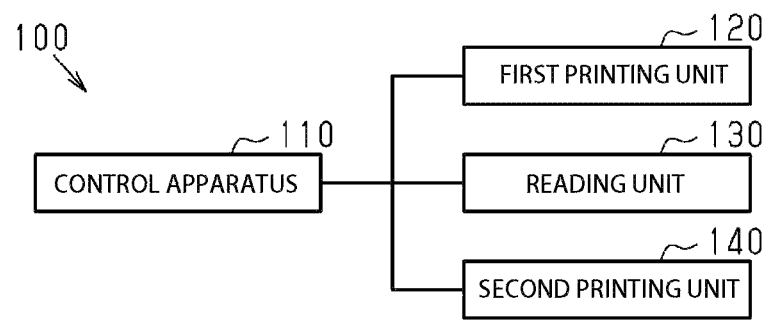
FIG. 3 illustrates a schematic configuration of the printing system according to the embodiment.

As shown in FIG. 3, a printing system 100 includes a control apparatus 110, which is an example of a printing control apparatus, a first printing unit 120, a reading unit 130, and a second printing unit 140.

The first printing unit 120 performs printing using a material that exhibits structural color. Specifically, the first printing unit 120 forms the structural color portions 12 and the ID portions 18 on the substrate sheet 14 by thermal transfer using a hologram ribbon. The first printing unit 120 includes thermal heads and functions as a thermal printer.

The reading unit 130 receives from the first printing unit 120 a sheet body, which is a media sheet 15 during production, that is, a substrate sheet 14 on which the first printing unit 120 has performed printing, and reads the information group IDs printed on the sheet body. Then, the reading unit 130 passes the sheet body to the second printing unit 140.

The second printing unit 140 performs printing using a material that includes pigment. Specifically, the second printing unit 140 forms the pigmented portions 13 on the sheet body by printing using a colored material such as toner or ink. The configuration of the second printing unit 140 is not particularly limited as long as it functions as a printer that uses a colored material. For example, the second printing unit 140 may function as a laser printer or an inkjet printer. For mass production of the media sheet 15, a second printing unit 140 functioning as a laser printer is preferably used.

The control apparatus 110 is a computer apparatus that communicates with each of the first printing unit 120, the reading unit 130, and the second printing unit 140. The control apparatus 110 manages the data for forming the media sheet 15. The control apparatus 110 controls the production of the media sheet 15 performed by the printing system 100 through the output of data to the first printing unit 120 and the output of data to the second printing unit 140. The control apparatus 110 outputs data for printing to the second printing unit 140 based on the information group IDs read by the reading unit 130.

After the media sheet 15 is formed by the printing system 100, a layer such as a protective layer is laminated on the media sheet 15 by a lamination process or the like. The media sheet 15 is then cut into individual medium regions 16. As a result, the medium regions 16 become personal information media 10, and the production of the personal information media 10 is completed.

[Detailed Configuration of First Printing Unit]

The detailed configuration of the first printing unit 120 will be described with reference to FIGS. 4 to 7.

Figure 4:
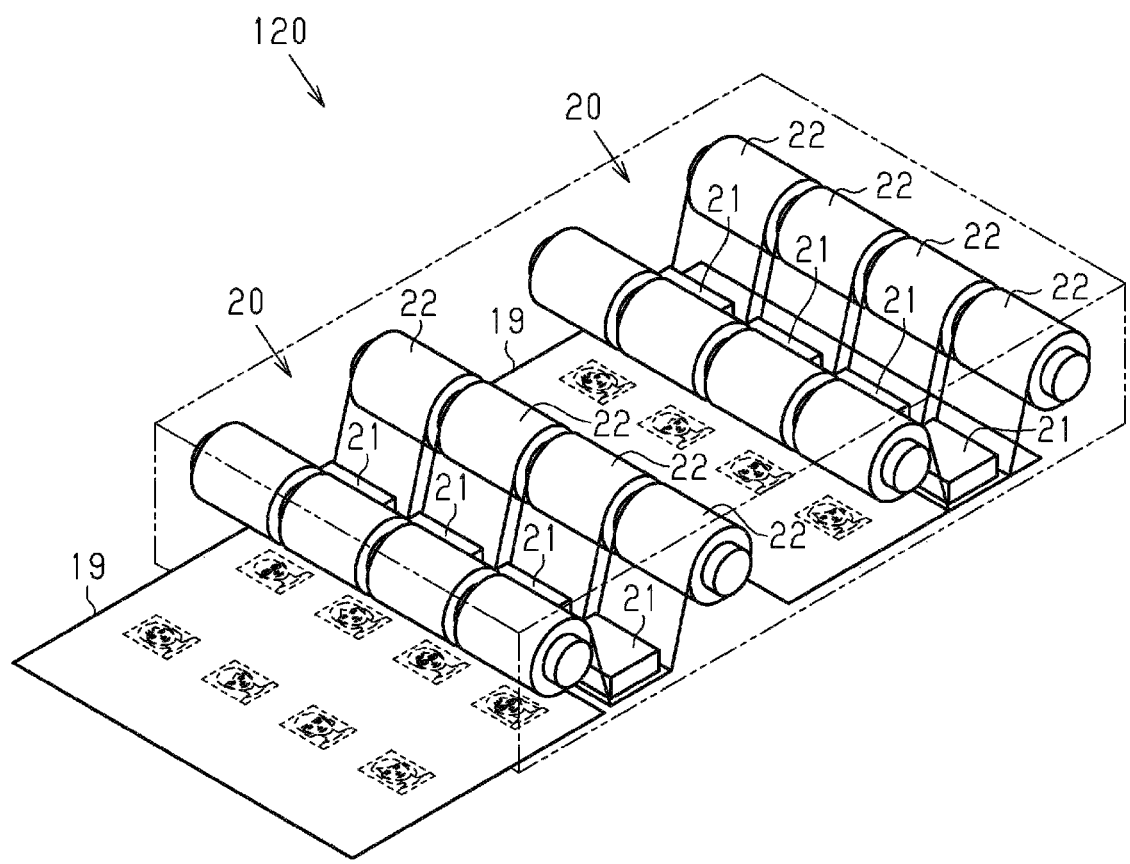
FIG. 4 illustrates a configuration of a first printing unit provided in the printing system according to the embodiment.

As shown in FIG. 4, the first printing unit 120 includes head rows 20 each composed of a plurality of thermal heads 21. In each head row 20, a plurality of thermal heads 21 are arranged in a row. Specifically, each thermal head 21 is supported by a support (not shown) so that a plurality of thermal heads 21 are arranged in a row. The direction in which the thermal heads 21 are arranged is a direction orthogonal to the transport direction of hologram ribbons 22 used for printing and is the width direction of the hologram ribbons 22.

The first printing unit 120 includes a plurality of head rows 20, which constitute a head unit. The plurality of head rows 20 are arranged in a direction orthogonal to the direction in which the head rows 20 extend. That is, the plurality of head rows 20 are parallel to each other. In an example of the present embodiment, the first printing unit 120 includes two head rows 20 each composed of four thermal heads 21.

Figure 5:
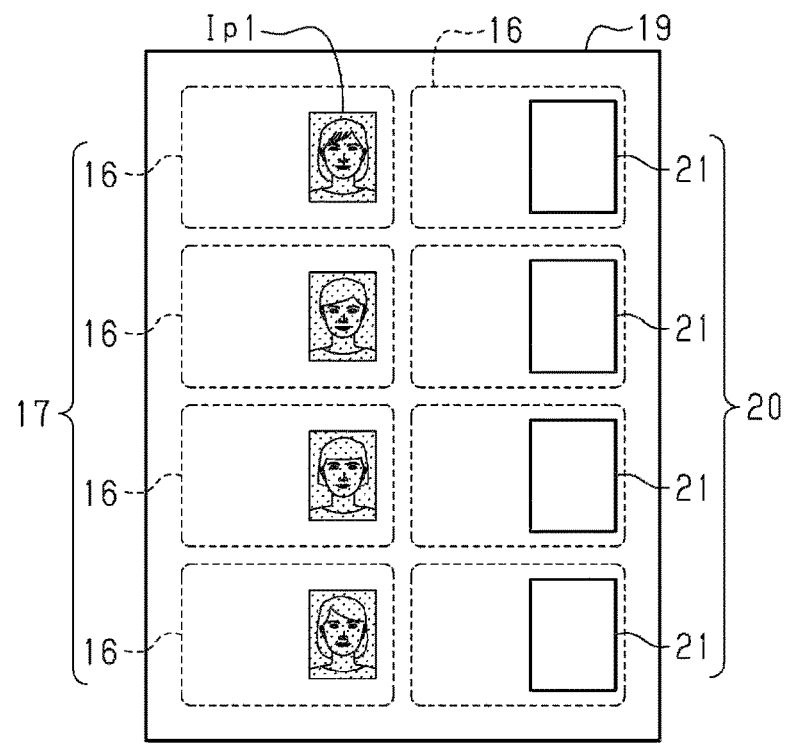
FIG. 5 illustrates the relationship between the arrangement of medium regions and the arrangement of thermal heads provided in the printing system according to the embodiment.

FIG. 5 schematically illustrates the relationship between the arrangement of medium regions 16 and the arrangement of thermal heads 21. The sheet body 19 is a media sheet 15 during production and has medium regions 16 and medium region rows 17 in the same arrangement as the media sheet 15 produced.

As shown in FIG. 5, the number of thermal heads 21 constituting one head row 20 matches the number of medium regions 16 constituting one medium region row 17. Further, the plurality of thermal heads 21 in the head row 20 are arranged so that each thermal head 21 corresponds to a respective one of the medium regions 16 constituting the medium region row 17. That is, the plurality of thermal heads 21 are arranged at intervals corresponding to intervals at which the medium regions 16 are arranged in the medium region row 17.

The thermal heads 21 each include a plurality of resistive heating elements arranged in a row. The plurality of resistive heating elements are configured to selectively generate heat by being energized, and portions of the hologram ribbon 22 are pressed by the resistive heating elements having generated heat to be transferred to the sheet body 19. Thus, dots exhibiting structural color are thermally transferred from the hologram ribbon 22 onto the sheet body 19.

The hologram ribbons 22 are disposed for the respective thermal heads 21. That is, the hologram ribbons 22 assembled to the first printing unit 120 correspond in number to the thermal heads 21.

The hologram ribbon 22 is a strip-shaped sheet provided with a supporting substrate and a transfer layer. The transfer layer is pressed by the resistive heating elements of the thermal head 21 to be transferred to the sheet body 19. The transfer layer has a laminated structure including a fine structure layer in which a diffraction grating is formed, a reflective layer, a release layer, and the like. The transfer layer of the hologram ribbon 22 has a red region having a diffraction grating from which red diffracted light emerges in a predetermined direction, a green region having a diffraction grating from which green diffracted light emerges in a predetermined direction, and a blue region having a diffraction grating from which blue diffracted light emerges in a predetermined direction. Further, in the transfer layer, the red region, the green region, and the blue region are repeatedly arranged in a predetermined order in the direction in which the hologram ribbon 22 extends.

As a result of the transfer of the red region, green region, and blue region onto a region in the sheet body 19, dots of each color are arranged in the region. A structural color portion 12 is thus formed that displays a color image. The diffraction gratings are configured to produce diffracted light having a predetermined wavelength in a predetermined direction with respect to the incident light, and the hologram constituting the structural color portion 12 is configured such that, for example, when it receives white light perpendicularly incident on the paper surface, an image can be observed at positions at an angle of 45 degrees to the incidence direction of the white light.

In the present embodiment, the structural color portions 12 of the plurality of medium regions 16 constituting one medium region row 17 are formed by different thermal heads 21. In other words, the first personal information item Ip1 of one medium region 16 is printed by one thermal head 21, and each thermal head 21 of one head row 20 prints the first personal information item Ip1 of a different one of the medium regions 16. Thus, the first personal information items Ip1 of the medium regions 16 constituting one medium region row 17 are printed. The plurality of thermal heads 21 constituting one head row 20 simultaneously perform printing on the plurality of medium regions 16 constituting one medium region row 17.

According to the configuration of the present embodiment, compared with a form in which one thermal head 21 has a length corresponding to the plurality of medium regions 16, and a hologram ribbon 22 having a length corresponding to the plurality of medium regions 16 is used to collectively print the plurality of medium regions 16, it is possible to use a hologram ribbon 22 having a small width similar to the width of the medium region 16. As a result of the printing being performed with hologram ribbons 22 having such a small width provided for the respective thermal heads 21, compared with the abovementioned form in which the plurality of medium regions 16 are collectively printed, unnecessary consumption of the hologram ribbon 22 in portions corresponding to the space between adjacent medium regions 16 is prevented.

Further, in the present embodiment, when producing one media sheet 15, one of the two head rows 20 performs printing on one of the two medium region rows 17, and the other of the two head rows 20 performs printing on the other of the two medium region rows 17. The two head rows 20 simultaneously print on different sheet bodies 19. As a result, compared with a configuration in which the first printing unit 120 is provided with a single head row 20, the number of sheet bodies 19 printed per unit time increases. The efficiency of producing the media sheet 15 is thus improved.

Each of the two head rows 20 prints an information group ID on one sheet body 19. Specifically, referring to one of the head rows 20 as a first head row 20 and the other head row as a second head row 20, one thermal head 21 of the first head row 20 and one thermal head 21 of the second head row 20 each print an information group ID. Further, the position of the thermal head 21 in the first head row 20 that prints the information group ID is different from the position of the thermal head 21 in the second head row 20 that prints the information group ID. For example, the first head row 20 is comprised of first to fourth thermal heads 21. The second head row 20 is also comprised of first to fourth thermal heads 21 that are respectively adjacent to the first to fourth thermal heads 21 of the first head row 20. For example, the second thermal head 21 of the first head row 20 is configured to print the information group ID, and the third thermal head 21 of the second head row 20 is configured to print the information group ID. With this configuration, the two information group IDs are printed alongside different medium regions 16 in one medium region row 17.

The edge of each sheet body 19 may have printed thereon identification information for the substrate sheet 14 thereof. For the thermal heads 21 that print the information group IDs, it is preferred that thermal heads 21 are selected which are arranged in locations that do not overlap with the identification information of the substrate sheet 14.

The structure in the vicinity of one thermal head 21 will be described with reference to FIG. 6, including the mode in which the hologram ribbon 22 and the sheet body 19 are transported.

Figure 6:
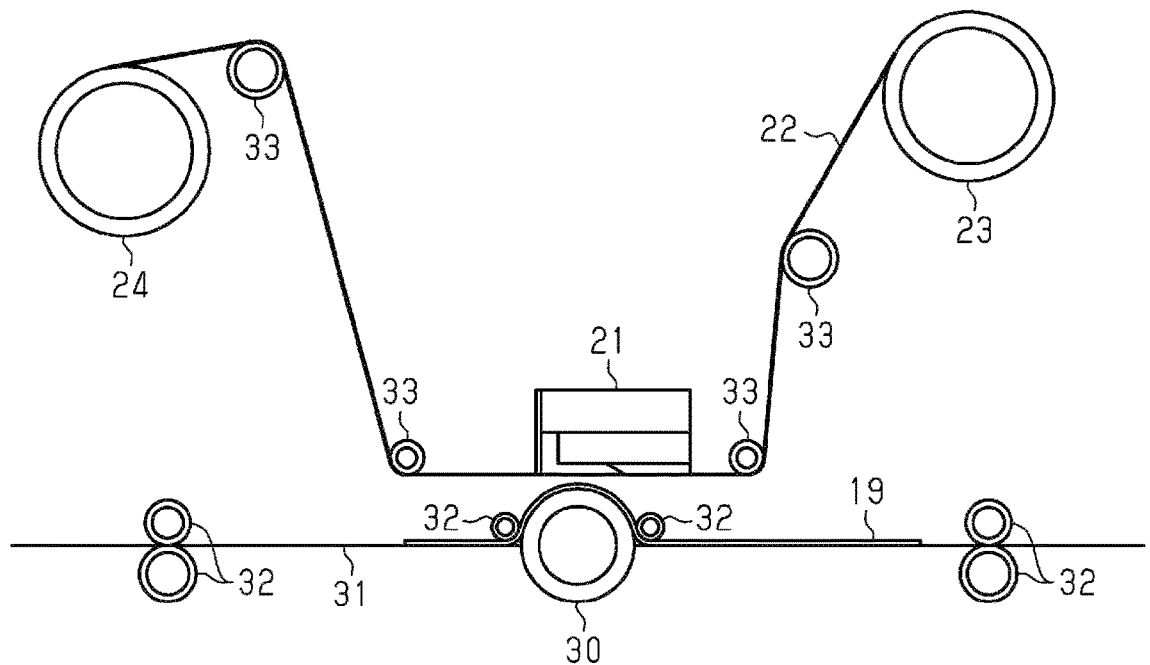
FIG. 6 illustrates the configuration in the vicinity of a thermal head of the first printing unit in the printing system according to the embodiment.

As shown in FIG. 6, platen rollers 30 are disposed that face the resistive heating elements of the respective thermal heads 21. The axial direction of the platen roller 30 coincides with the direction in which the row of resistive heating elements extends. The sheet body 19 is transported in a direction orthogonal to the axial direction of the platen roller 30 and passes between the thermal head 21 and the platen roller 30 while following the surface of the platen roller 30. The sheet body 19 is transported by cooperation between a transport track 31 that supports the sheet body 19 and a plurality of rollers 32 on the transport track.

The hologram ribbon 22 is drawn out from a ribbon roll 23 on which the ribbon is wound in a roll shape, passes between the thermal head 21 and the platen roller 30, and is wound on a take-up roll 24. In the space between the thermal head 21 and the platen roller 30, the hologram ribbon 22 passes between the sheet body 19 and the thermal head 21 and is transported in a direction orthogonal to the axial direction of the platen roller 30. The width direction of the hologram ribbon 22 coincides with the direction in which the row of resistive heating elements extends. The hologram ribbon 22 is transported by cooperation between a mechanism that rotates the rolls 23 and 24 and a plurality of rollers 33 on a transport path. On the transport path of the hologram ribbon 22, a sensor is provided for determining the position of each color region of the hologram ribbon 22.

In the above configuration, the resistive heating elements of the thermal head 21 press the hologram ribbon 22 against the sheet body 19 on the platen roller 30, which causes the transfer layer of the hologram ribbon 22 to be transferred onto the sheet body 19. The printing by transfer is performed while the sheet body 19 and the hologram ribbon 22 are being transported in the same direction. When the transfer of the first color region is completed, the sheet body 19 is pulled back and the hologram ribbon 22 is fed so that the second color region is placed under the thermal head 21. Then, the transfer of the second color region is performed while the sheet body 19 and the hologram ribbon 22 are once again being transported in the same direction. The same movement is repeated to transfer the third color region, and this results in the formation of the structural color portion 12.

The order in which the structural color portions 12 and the ID portion 18 are formed is not limited, and the formation of the ID portion 18 is not limited to transfer of a particular color region. For example, one color region for forming the ID portion 18 may be transferred after each of the color regions for forming the structural color portions 12 have been transferred. Alternatively, the ID portion 18 may be formed by transferring a plurality of color regions. That is, the display color of the information group ID may be any color as long as it is a structural color, and may be a single color or a plurality of colors.

The positions of the thermal heads 21 are preferably controlled so that, during formation of the ID portion 18, the thermal head 21 in one head row 20 that is forming the ID portion 18, that is, only the thermal head 21 assigned to print the information group ID, makes contact with the hologram ribbon 22, and the other thermal heads 21 are separated from the hologram ribbon 22.

The relationship between the size of the thermal head 21 and the width of the hologram ribbon 22 will be described with reference to FIG. 7.

Figure 7:
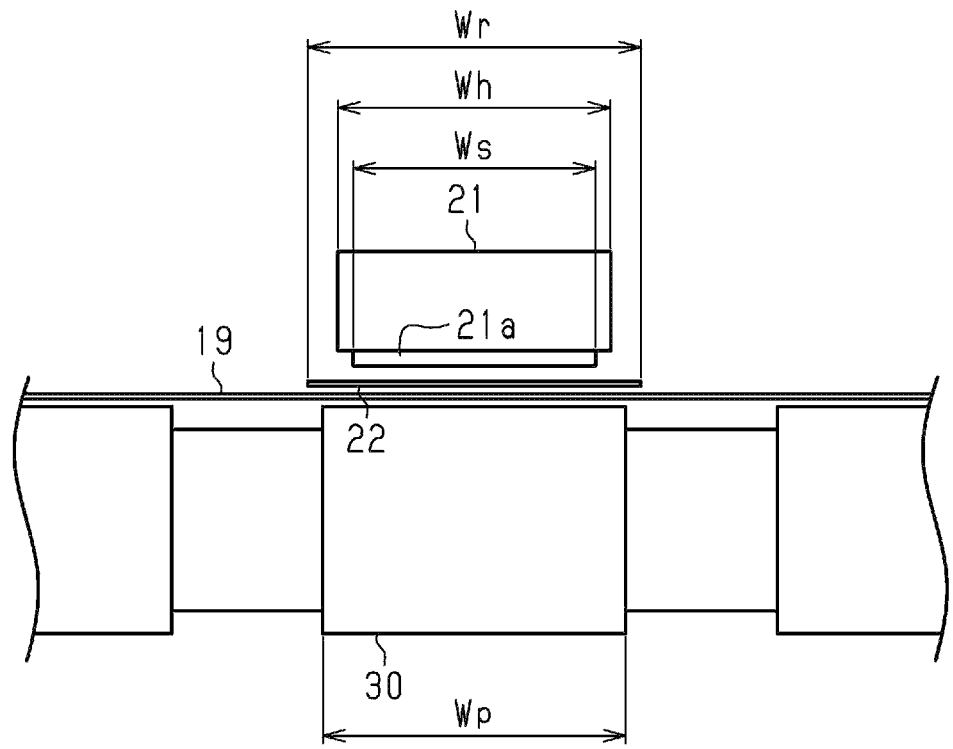
FIG. 7 illustrates the relationship between the lengths of a thermal head and a hologram ribbon according to the embodiment.

As shown in FIG. 7, the width Wr of the hologram ribbon 22 is preferably greater than the length Ws of the resistor row 21a, which is the row of resistive heating elements in the thermal head 21. This configuration prevents the resistor row 21a from making contact with the sheet body 19 outside the hologram ribbon 22 when the hologram ribbon 22 is transferred. Furthermore, the width Wr of the hologram ribbon 22 is preferably greater than the width Wh of the entire thermal head 21. This configuration prevents the edge of the thermal head 21 from making contact with the sheet body 19 outside the hologram ribbon 22 when the hologram ribbon 22 is transferred.

As a result of preventing direct contact of the resistor row 21a and the edge of the thermal head 21 with the sheet body 19, the formation of scratches on the sheet body 19 is prevented.

The length Ws of the resistor row 21a and the width Wh of the entire thermal head 21 need to be greater than the width of the structural color portion 12 to be formed but may be less than or equal to the width of the medium region 16. Specifically, the length Ws and the width Wh may be less than the width of the medium region 16 as long as they are greater than the width of the facial image, which is the first personal information item Ip1. The configuration where the length Ws and the width Wh are less than the width of the medium region 16 enables the use of a hologram ribbon 22 having a smaller width, which further reduces unnecessary consumption of the hologram ribbon 22.

Furthermore, the width Wp of the platen roller 30 in the axial direction needs to be greater than the width of the structural color portion 12 to be formed but may be less than or equal to the width of the medium region 16. That is, the width Wp of the platen roller 30 in the axial direction may be less than the width of the medium region 16 as long as it is greater than the width of the facial image, which is the first personal information item Ip1. The width Wr of the hologram ribbon 22, the width Wp of the platen roller 30 in the axial direction, the width Wh of the entire thermal head 21, and the length Ws of the resistor row 21a preferably decrease in this order. The width Wh of the entire thermal head 21 may be greater than the width Wp of the platen roller 30 in the axial direction as long as it is less than the width Wr of the hologram ribbon 22.

Figure 8:
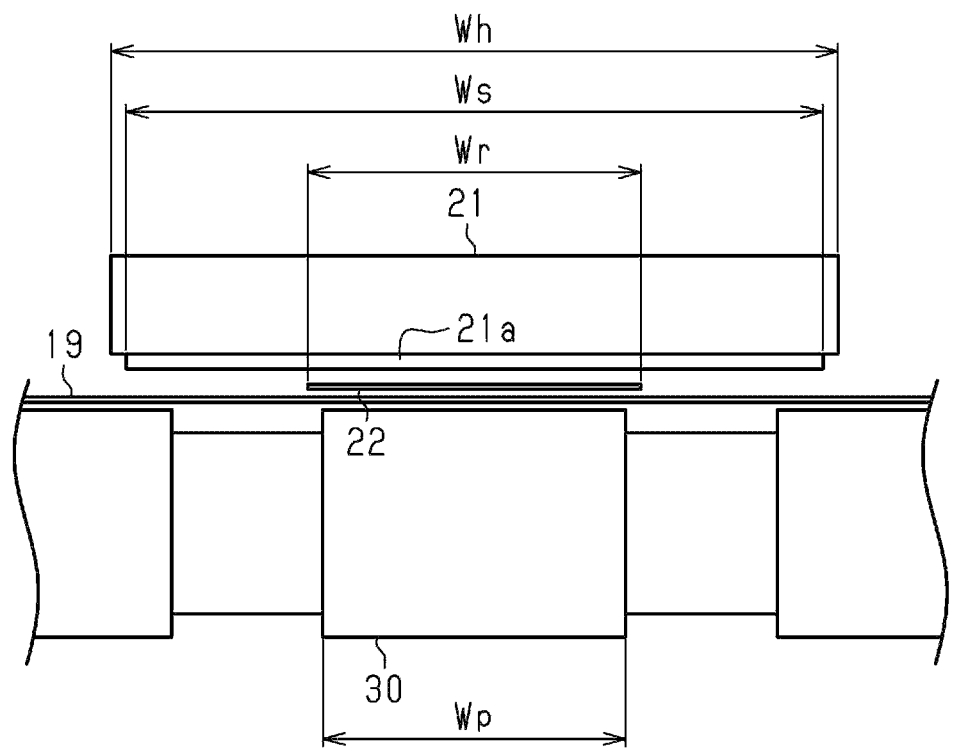
FIG. 8 illustrates the relationship between the lengths of a conventional thermal head and hologram ribbon.

As shown in FIG. 8, even when a conventional large thermal head 21 is used, a hologram ribbon 22 having a small width can be used to reduce the amount of the hologram ribbon 22 used. However, if the width Wr of the hologram ribbon 22 is less than the length Ws of the resistor row 21a and the width Wh of the entire thermal head 21, as mentioned above, the sheet body 19 may become scratched due to the resistor row 21a or the edge of the thermal head 21 making direct contact with the sheet body 19. In contrast, by making the thermal head 21 itself smaller and using a hologram ribbon 22 having a small width, scratching of the sheet body 19 can be prevented while reducing the amount of the hologram ribbon 22 used.

The hardness of the platen roller 30 required for transfer of the hologram ribbon 22 is higher than the hardness of a platen roller used for the transfer of an ink ribbon having a layer made of pigment ink, or in a dye-sublimation thermal printer. Specifically, the Shore hardness of a platen roller used in a dye-sublimation thermal printer is about 50 to 60, while the Shore hardness of the platen roller 30 used in the present embodiment is 90 or more.

When the platen roller 30 is hard, slight variations in the amount of pressing by each heating element are not easily evened out. Therefore, when attempting to make the resistive heating elements press evenly, the adjustments required to even out the amount of pressing by each resistive heating element becomes more complicated as the length Ws of the resistor row 21 becomes greater. By using small thermal heads 21 for respective medium regions 16 as described in the present embodiment, the adjustments required to even out the amount of pressing by each heating element become simple.

With the configuration where a plurality of thermal heads 21 constitute a head unit, even if a defect occurs in a portion of a thermal head 21, it is possible to exchange only the defective thermal head 21 without exchanging the entire head unit. Therefore, this configuration reduces the need for large-scale work to resolve the defect.

[Electrical Configuration of Printing System]

Figure 9:
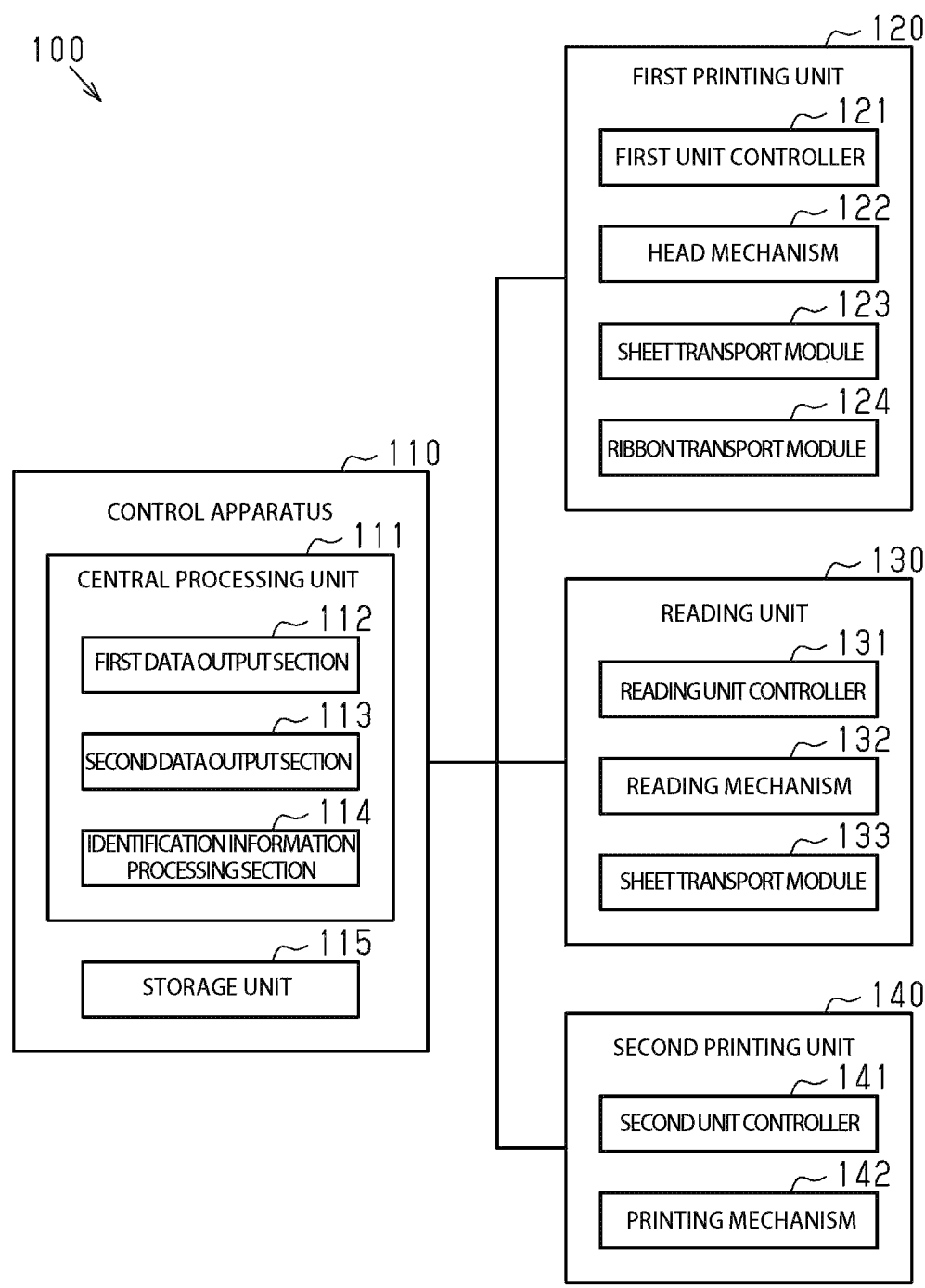
FIG. 9 illustrates a configuration of the printing system according to the embodiment.

The detailed configuration of the printing system 100 will be described with reference to FIG. 9, focusing on the electrical configuration.

The control apparatus 110 includes a central processing unit 111 and a storage unit 115. The central processing unit 111 includes a CPU and a volatile memory such as a RAM and performs processes based on programs and data stored in the storage unit 115. The central processing unit 111 includes a first data output section 112, a second data output section 113, and an identification information processing section 114 as functional components.

The first data output section 112 outputs, to the first printing unit 120, first data Dt1, which is data for forming the structural color portions 12 and the ID portions 18. The first data Dt1 is data for printing the first personal information items Ip1 of a first information group Gi1 on the corresponding respective medium regions 16 and for printing an information group ID linked to the first information group Gi1 outside the medium regions 16.

Figure 10:
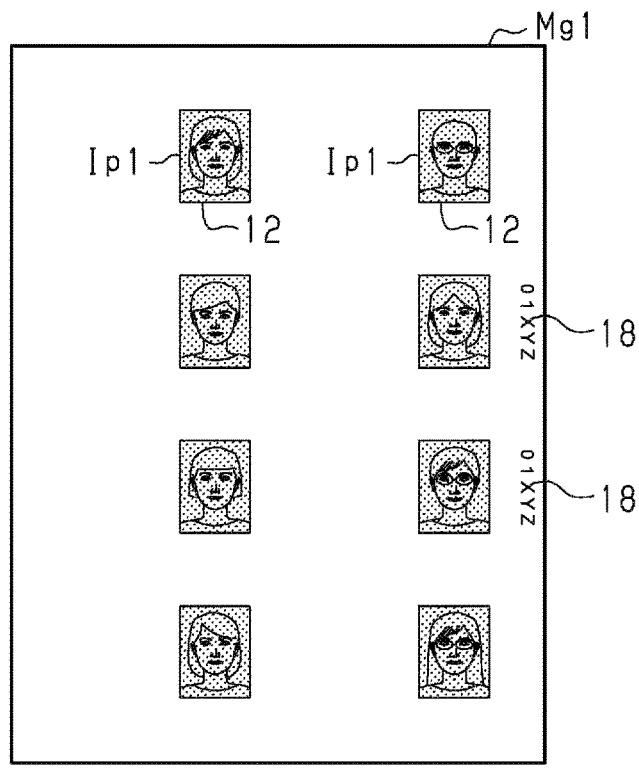
FIG. 10 illustrates an example of images constituting first data in the printing system according to the embodiment.

As shown in FIG. 10, for example, the first data Dt1 is data of an image Mg1 composed of the structural color portions 12 and the ID portions 18 of one media sheet 15, that is, data of an image Mg1 including all of the first personal information items Ip1 included in the first information group Gi1 and the information group IDs. In the image Mg1, the plurality of first personal information items Ip1 are arranged according to the arrangement of the medium regions 16, and the information group IDs are each arranged with a predetermined space relative to one of the first personal information items Ip1 so that each of the information group IDs is to be alongside the corresponding medium region 16.

The first data Dt1 may be data indicating the transfer locations of each color region of the hologram ribbon 22, that is, data indicating the arrangement of the dots of each color, or data that can be converted into such data by the first printing unit 120.

The first data Dt1 is not limited to being data of one image and may be data for instructing the first printing unit 120 to perform printing by indicating the print content and print locations for the respective first personal information items Ip1 and the information group IDs.

The second data output section 113 outputs, to the second printing unit 140, second data Dt2, which is data for forming the pigmented portions 13. The second data Dt2 is data for printing the second personal information items Ip2 of a second information group Gi2 on the corresponding respective medium regions 16 on which the first personal information items Ip1 to be combined with the respective second information items Ip2 have been printed. The second data output section 113 outputs the second data Dt2 corresponding to the second information group Gi2 that has been identified based on the read information group IDs.

Figure 11:
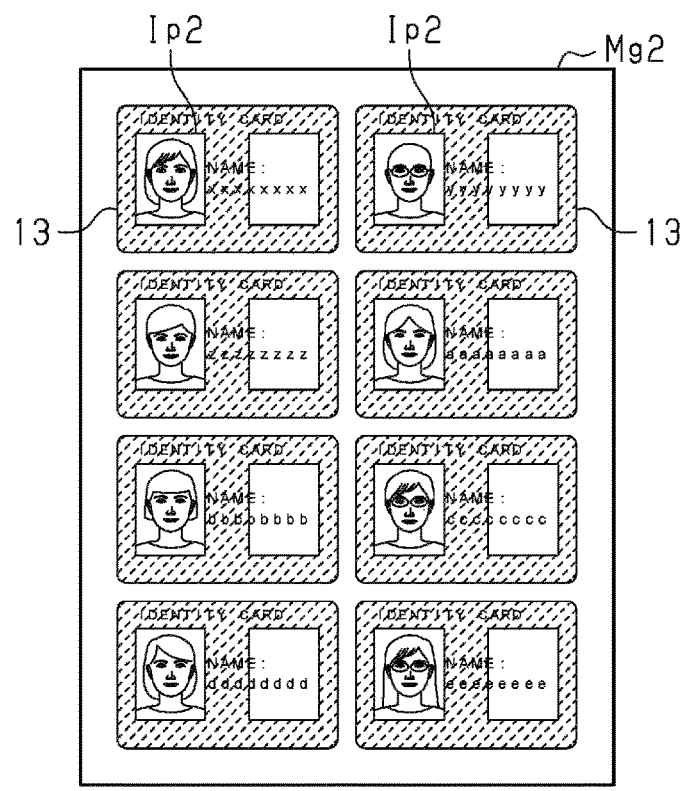
FIG. 11 illustrates an example of images constituting second data in the printing system according to the embodiment.

As shown in FIG. 11, for example, the second data Dt2 is data of an image Mg2 composed of the pigmented portions 13 of one media sheet 15, that is, data of an image Mg2 including all of the second personal information items Ip2 included in the second information group Gi2. In the image Mg2, the plurality of second personal information items Ip2 are arranged such that each second personal information item Ip2 is to be located in a corresponding one of the medium regions 16 on which the linked first personal information item Ip1 is located.

The second data Dt2 may be data which includes color information for each pixel so that a color image can be printed.

The second data Dt2 is not limited to being data of one image and may be data for instructing the second printing unit 140 to perform printing by indicating the print content and print locations for the respective second personal information items Ip2.

The identification information processing section 114 performs a verification process using the result of reading of the information group IDs performed by the reading unit 130. The verification process includes processing that determines whether the two information group IDs match each other, processing that identifies the first information group Gi1 and the second information group Gi2 linked to the information group ID in the storage unit 115, and processing that determines whether the first data Dt1 using the identified first information group Gi1 has already been outputted to the first printing unit 120.

The storage unit 115 includes a non-volatile memory and stores programs and data necessary for processes performed by the central processing unit 111. As part of such data, the storage unit 115 stores the first information group Gi1 and the second information group Gi2 included in one media sheet 15 in association with an information group ID. That is, a different information group ID is assigned to each media sheet 15 to be formed, or in other words, to each set of the first information group Gi1 and the second information group Gi2. In addition, the storage unit 115 links the first personal information item Ip1 and the second personal information item Ip2 included in one personal information medium 10, or in other words, associates the first personal information item Ip1 and the second personal information item Ip2 in combination for each personal information medium 10, through the information stored in the storage unit 115.

For example, the first information group Gi1 and the second information group Gi2 may be linked to an information group ID by linking the pieces of facial image data representing respective first personal information items Ip1 included in the first information group Gi1 with the information group ID, and the pieces of facial image data representing respective second personal information items Ip2 included in the second information group Gi2 with the information group ID. Alternatively, the first information group Gi1 and the second information group Gi2 may be linked to the information group ID as a result of the image Mg1 and the image Mg2 being linked to the information group ID. Alternatively, the information group ID may be included in the image Mg1 to link the first information group Gi1 with the information group ID, and the second information group Gi2 may be linked to the information group ID separately.

The correspondence between the first personal information item Ip1 and the second personal information item Ip2 may be made by directly linking the first personal information item Ip1 and the second personal information item Ip2. Alternatively, the correspondence between the first personal information item Ip1 and the second personal information item Ip2 may be made according to the prescribed printing position of the first personal information item Ip1 and the second personal information item Ip2. Specifically, the configuration such that the first personal information item Ip1 and the second personal information item Ip2 are to be printed in the same medium region 16 may function as the link between the first personal information item Ip1 and the second personal information item Ip2.

For example, in the case where the image Mg1 and the image Mg2 are generated in advance and stored in the storage unit 115, the image Mg1 and the image Mg2 are generated so that the first personal information item Ip1 and the second personal information item Ip2 to be combined are arranged in the same medium region 16. As a result, the correspondence between the first personal information item Ip1 and the second personal information item Ip2 is established.

Furthermore, information defining the arrangement of each first personal information item Ip1 may be prepared in advance, and the first data output section 112 may use this information and pieces of facial image data representing respective first personal information items Ip1, to generate the image Mg1, and information defining the arrangement of each second personal information item Ip2 may be prepared in advance, and the second data output section 113 may use this information and pieces of facial image data representing respective second personal information items Ip2, to generate the image Mg2. Similarly in this case, the configuration such that the first personal information item Ip1 and the second personal information item Ip2 are to be arranged in the same medium region 16 according to the information defining the arrangement of each first personal information item Ip1 and the information defining the arrangement of each second personal information item Ip2 functions as the link between the first personal information item Ip1 and the second personal information item Ip2.

Alternatively, if data that directly links first personal information items Ip1 with respective second personal information items Ip2 is stored in the storage unit 115, the image Mg1 may be generated by arbitrarily setting the arrangement of the first personal information items Ip1, and the image Mg2 may then be generated by determining the arrangement of the second personal information items Ip2 such that the first personal information item Ip1 and second personal information item Ip2 linked to each other are arranged in the same medium region 16.

In short, the first data Dt1 and the second data Dt2 need to be configured such that each pair of the first personal information item Ip1 and the second personal information item Ip2 for a separate personal information medium 10 is printed on the corresponding medium region 16. Further, such first data Dt1 and second data Dt2 are stored in the storage unit 115 or generated based on information stored in the storage unit 115.

The control apparatus 110 may be connected in a wired or wireless manner to each of the first printing unit 120, the reading unit 130, and the second printing unit 140. The control apparatus 110 includes an interface for communication with each of the first printing unit 120, the reading unit 130, and the second printing unit 140, and each section of the central processing unit 111 exchanges data with each unit through the interface.

The functions of the first data output section 112, the second data output section 113, and the identification information processing section 114 of the central processing unit 111 may be respectively implemented by various pieces of hardware such as a plurality of CPUs and memory such as a RAM, and software that causes these components to function, or may be implemented by software that provides a plurality of functions to a shared, single piece of hardware. Such software is stored in the storage unit 115 as a printing control program.

The first printing unit 120 includes a first unit controller 121, a head mechanism 122, a sheet transport module 123, and a ribbon transport module 124.

The first unit controller 121 includes a CPU and a memory and controls the operation of the first printing unit 120. The first unit controller 121 also includes an interface for communication with the control apparatus 110 and exchanges data with the control apparatus 110 through the interface.

The head mechanism 122 is a head unit that includes head rows 20 each composed of a plurality of thermal heads 21 described above. The sheet transport module 123 is a mechanism for transporting a sheet body 19 and includes the platen rollers 30 described above, the transport track 31, the rollers 32, a motor for driving the rollers, and the like. The ribbon transport module 124 is a mechanism for transporting the hologram ribbons 22 and includes the mechanism that rotates the rolls 23 and 24 described above, the rollers 33, and a motor for driving the rollers, and the like.

The first unit controller 121 receives the first data Dt1 from the control apparatus 110. The first unit controller 121 outputs signals to the thermal heads 21 of each head row 20, drives the sheet transport module 123 to transport the sheet body 19, and drives the ribbon transport module 124 to transport the hologram ribbons 22 so that printing based on the first data Dt1 is performed.

The plurality of thermal heads 21 included in one head row 20 can be driven in synchronization with each other. The plurality of platen rollers 30 facing the respective thermal heads 21 can be driven in synchronization with each other, and the plurality of hologram ribbons 22 assembled to the respective thermal heads 21 can be transported in synchronization with each other.

The first unit controller 121 outputs, to each thermal head 21, data indicating the print content for the corresponding thermal head 21, based on, for example, the first data Dt1. Specifically, the first unit controller 121 divides the print content indicated by the first data Dt1 into a plurality of regions and assigns the data regions to the respective thermal heads 21 according to the arrangement of the plurality of thermal heads 21, and outputs the assigned pieces of data to the respective thermal heads 21. As a result, the parts of the first data Dt1 that correspond to respective medium regions 16 are outputted to the respective thermal heads 21 each responsible for printing on the corresponding medium region 16. Each thermal head 21 includes a controller that controls energization of the resistive heating elements in the thermal head 21. The controller of each thermal head 21 converts the data supplied from the first unit controller 121 into data for forming a color image using a hologram composed of dots of three colors. Then, the controller of each thermal head 21 controls energization of the resistive heating elements based on the converted data, so that dots of each color are transferred from the hologram ribbon 22 onto the sheet body 19.

In the above configuration, each of the first data Dt1 and the data outputted by the first unit controller 121 to each thermal head 21 has, for example, the same format as typical image data, and such data is converted by the controller of each thermal head 21 into data for forming a color facial image with a hologram (e.g., data that includes the arrangement of the dots of each color). Because the computational load required for such a conversion is high, a longer time is required for data conversion as the conversion target region becomes larger. Compared with a conventional configuration in which one thermal head 21 collectively prints on a plurality of medium regions 16, a configuration in which one thermal head 21 prints on one medium region 16 as in the present embodiment reduces the size of the region printed on by one thermal head 21, that is, the size of the region requiring computation for one thermal head 21. This configuration of the present embodiment thus shortens the time required for data conversion, thereby reducing the time required for printing to complete after the first printing unit 120 receives the first data Dt1 from the control apparatus 110. Therefore, the number of sheet bodies 19 printed per unit time by the first printing unit 120 can be increased.

The reading unit 130 includes a reading unit controller 131, a reading mechanism 132, and a sheet transport module 133.

The reading unit controller 131 includes a CPU and memory and controls the operation of the reading unit 130. The reading unit controller 131 also includes an interface for communication with the control apparatus 110 and exchanges data with the control apparatus 110 through the interface.

The reading mechanism 132 is a mechanism for reading the information group IDs printed by the first printing unit 120. The reading mechanism 132 includes an irradiation unit that irradiates the ID portions 18 with light for reproducing the image, and an image capture unit that captures an image of the reproduced image.

The sheet transport module 133 is a mechanism for transporting the sheet body 19 and includes a transport track that supports the sheet body 19, rollers, a motor for driving the rollers, and the like.

When the sheet body 19 has been delivered from the first printing unit 120, the reading unit controller 131 drives the reading mechanism 132 and the sheet transport module 133 to capture an image of the information group IDs printed on the sheet body 19 and read the information group IDs. Then, the reading unit controller 131 transmits the acquired information to the control apparatus 110. Specifically, the reading unit controller 131 may recognize the information group IDs by analyzing the image captured by the reading mechanism 132 and transmit the recognized information group IDs to the control apparatus 110 as the acquired information. Alternatively, the reading unit controller 131 may transmit the data of the image captured by the reading mechanism 132 to the control apparatus 110 as the acquired information, and the identification information processing section 114 of the control apparatus 110 may analyze the image to recognize the information group IDs.

The second printing unit 140 includes a second unit controller 141 and a printing mechanism 142.

The second unit controller 141 includes a CPU and memory and controls the operation of the second printing unit 140. The second unit controller 141 also includes an interface for communication with the control apparatus 110 and exchanges data with the control apparatus 110 through the interface.

The printing mechanism 142 is a mechanism for performing printing using a colored material. When, for example, the second printing unit 140 functions as a laser printer, the printing mechanism 142 includes mechanisms such as a photosensitive drum, a laser irradiation unit, a toner supply unit, and a roller that performs processes such as charging, transfer, and fixing, and a mechanism that transports the sheet body 19.

The second unit controller 141 receives the second data Dt2 from the control apparatus 110 and drives the printing mechanism 142 so that printing based on the second data Dt2 is performed.

The central processing unit 111 of the control apparatus 110 may be responsible for some or all of the functions of the first unit controller 121, the reading unit controller 131, and the second unit controller 141 described above. That is, the control apparatus 110 may directly control the operation of the first printing unit 120, the reading unit 130, and the second printing unit 140.

Figure 12:
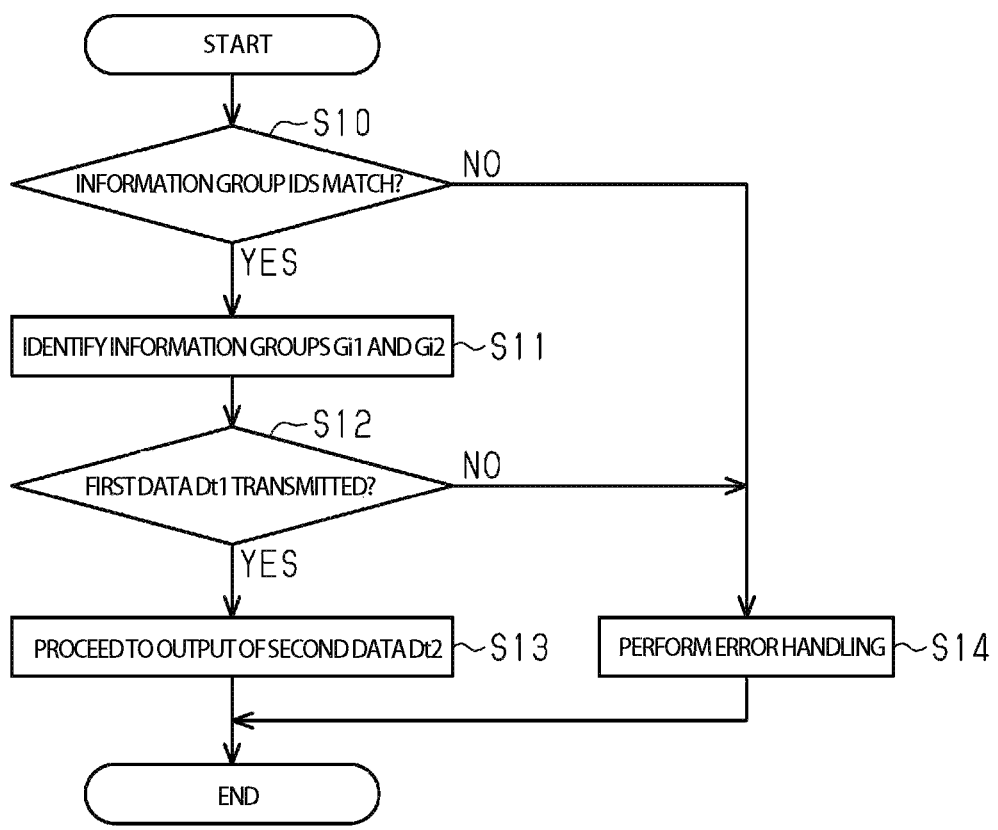
FIG. 12 is a flowchart illustrating a procedure for a verification process performed by the printing system according to the embodiment.

The verification process performed by the identification information processing section 114 of the control apparatus 110 will be described in detail with reference to FIG. 12.

The verification process starts when the identification information processing section 114 has acquired two information group IDs based on the information received from the reading unit 130. FIG. 12 is a flowchart illustrating a procedure for the verification process.

First, as the processing at step S10, the identification information processing section 114 determines whether the two information group IDs acquired match each other. If a positive determination is made at step S10, it is confirmed that the combination of first personal information items Ip1 of the two medium region rows 17 printed by the different head rows 20 is correct, that is, that the first information group Gi1 has been printed as indicated by the first data Dt1.

When the two information group IDs match each other (i.e., positive determination at step S10), the process proceeds to step S11 at which the identification information processing section 114 identifies the first information group Gi1 and the second information group Gi2 that are linked to the information group ID in the storage unit 115.

Next, as the processing at step S12, the identification information processing section 114 determines whether the first information group Gi1 identified in the processing at step S11 has been used for the first data Dt1 outputted to the first printing unit 120. The first data output section 112 stores information on the first data Dt1 outputted to the first printing unit 120 as a log in the storage unit 115, and the identification information processing section 114 makes the determination at step S12 by referring to the log.

If a positive determination is made at step S12, it is confirmed with certainty that the first printing unit 120 has been instructed to perform the printing of the first information group Gi1 corresponding to the information group IDs acquired from the sheet body 19. Thus, it is confirmed that the sheet body 19 targeted for reading by the reading unit 130 is a sheet body 19 that has been delivered to the reading unit 130 by the correct procedure, or in other words, a sheet body 19 on which the first personal information items Ip1 have already been printed, and the second personal information items Ip2 are to be printed next.

In the processing at step S12, the identification information processing section 114 may determine whether the elapsed time since the output of the first data Dt1 using the first information group Gi1 corresponding to the information group ID is within a predetermined range. The predetermined range is set to a reasonable range as the time from the output of the first data Dt1, followed by printing at the first printing unit 120, until the sheet body 19 reaches the reading unit 130. As a result, it can be confirmed more reliably that the sheet body 19 has been sent to the reading unit 130 by the correct procedure.

Furthermore, in the processing at step S12, the identification information processing section 114 may compare the order in which the information group IDs were read, including the information group ID that had previously been read, with the output order of the first data Dt1, to determine whether it is reasonable for the sheet body 19 targeted for reading by the reading unit 130 to have reached the reading unit 130 at that time.

If it is determined in the processing at step S12 that the first data Dt1 using the identified first information group Gi1 has already been outputted to the first printing unit 120 (i.e., positive determination at step S12), the process proceeds to step S13. As the processing at step S13, the identification information processing section 114 passes control to the second data output section 113 so that it outputs second data Dt2, and then ends the verification process. After taking over control, the second data output section 113 outputs, to the second printing unit 140, the second data Dt2 corresponding to the second information group Gi2 identified by the identification information processing section 114 in the processing at step S11.

If it is determined in the processing at step S10 that the two information group IDs do not match (i.e., negative determination at step S10), or if it is determined in the processing at step S12 that the first data Dt1 using the identified first information group Gi1 has not been outputted to the first printing unit 120 (i.e., negative determination at step S12), error handling is performed as the processing at step S14. In this case, control is not passed to the second data output section 113, so that the second data Dt2 is not outputted to the second printing unit 140. The error handling may include, for example, transmission of an error signal to the reading unit 130 or external notification of the error.

[Operation of Printing System]

The operation of the printing system 100 will be described with reference to FIGS. 13 and 14.

Figure 13:
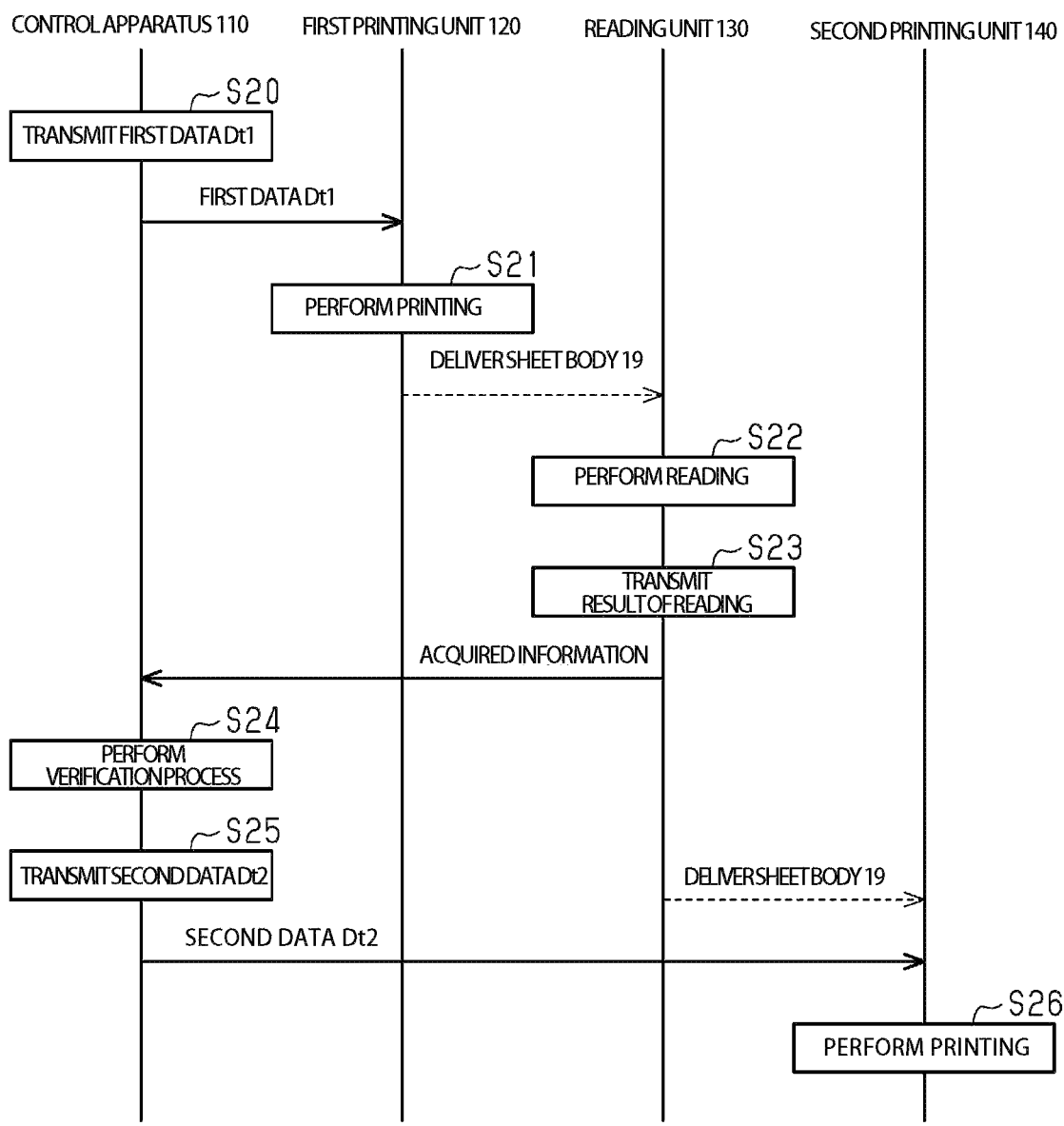
FIG. 13 is a sequence diagram illustrating a procedure for operations of the printing system according to the embodiment.

As shown in FIG. 13, when production of the media sheet 15 starts, the first data Dt1 corresponding to the media sheet 15 to be produced is transmitted from the control apparatus 110 to the first printing unit 120 (step S20).

In response to receiving the first data Dt1, the first printing unit 120 takes in a substrate sheet 14 and performs printing based on the first data Dt1 (step S21).

Specifically, first, the first head row 20 prints on the first medium region row 17 and prints the information group ID. Consequently, as shown in FIG. 14(a), the first personal information items Ip1 are printed on the respective medium regions 16 constituting the first medium region row 17, and one information group ID is printed. Thus, the sheet body 19 is in a state where the first personal information items Ip1 of one medium region row 17 and one information group ID have been printed.

Then, the second head row 20 prints on the second medium region row 17 and prints the information group ID. Consequently, as shown in FIG. 14(b), the first personal information items Ip1 are printed on the respective medium regions 16 constituting the second medium region row 17, and one information group ID is printed. Thus, the sheet body 19 is in a state where the first personal information items Ip1 of two medium region rows 17 and two information group IDs have been printed, whereby printing according to the first data Dt1 is completed.

When printing by the first printing unit 120 is completed, the sheet body 19 is delivered from the first printing unit 120 to the reading unit 130. This delivery of the sheet body 19 may be performed, for example, based on signals transmitted between the control apparatus 110 and the first printing unit 120 and reading unit 130. That is, a signal indicating the progress of printing by the first printing unit 120 and a signal indicating the progress of reading by the reading unit 130 are transmitted from the respective units 120 and 130 to the control apparatus 110, and based on these signals, the control apparatus 110 instructs the units 120 and 130 to deliver the sheet body 19 at an appropriate timing. The sheet body 19 is delivered as a result of the units 120 and 130 driving the sheet transport modules 123 and 133, respectively, according to instructions from the control apparatus 110.

Note that, if communication is possible between the first printing unit 120 and the reading unit 130, the units 120 and 130 may exchange signals without them going through the control apparatus 110 to deliver the sheet body 19. Furthermore, the sheet body 19 may be delivered manually.

In response to receiving the sheet body 19, the reading unit 130 reads the information group IDs from the sheet body 19 (step S22) and transmits the acquired information to the control apparatus 110 (step S23).

In response to receiving the acquired information, the control apparatus 110 performs the verification process (step S24) described above with reference to FIG. 12. When the verification process is completed without error and control passes from the identification information processing section 114 to the second data output section 113, the second data Dt2 corresponding to the second information group Gi2 linked to the information group ID is transmitted from the control apparatus 110 to the second printing unit 140 (step S25). If the verification process ends with error handling, the processing from step S25 onwards is not performed, so that the second data Dt2 is not transmitted to the second printing unit 140.

Upon completion of the verification process, the sheet body 19 is delivered from the reading unit 130 to the second printing unit 140. The delivery of the sheet body 19 may be executed, for example, based on signals transmitted between the control apparatus 110 and the reading unit 130 and second printing unit 140. For example, upon completion of reading by the reading unit 130, the control apparatus 110 may instruct the units 130 and 140 to deliver the sheet body 19. The delivery of the sheet body 19 is performed as a result of the units 130 and 140 driving the sheet transport module 133 and the printing mechanism 142, respectively, according to instructions from the control apparatus 110. If the verification process performed by the control apparatus 110 ends with error handling, for example, the sheet body 19 may be discharged by the second printing unit 140 after the sheet body 19 is delivered. Note that, if communication is possible between the reading unit 130 and the second printing unit 140, the units 130 and 140 may exchange signals without them going through the control apparatus 110 to perform delivery of the sheet body 19.

Alternatively, the control apparatus 110 may instruct the units 130 and 140 to deliver the sheet body 19 only when the verification process is completed at the control apparatus 110 without error. In this case, if the verification process ends with error handling, the sheet body 19 is not delivered, and the sheet body is discharged by the reading unit 130.

In response to receiving the second data Dt2, the second printing unit 140 performs printing based on the second data Dt2 (step S26). Consequently, as shown in FIG. 14(c), pigmented portions 13 are formed in the respective medium regions 16 constituting the medium region rows 17. That is, the second personal information item Ip2 is printed in all of the medium regions 16. Thus, the production of the media sheet 15 is completed.

According to the printing system 100 of the present embodiment, in the control apparatus 110, the first information group Gi1 and the second information group Gi2 for forming one media sheet 15 are linked to an information group ID, and the correspondence between the first personal information item Ip1 and the second personal information item Ip2 constituting one personal information medium 10 is made. Further, based on the read information group IDs printed together with the first information group Gi1, the second data Dt2 is outputted for printing the second information group Gi2 according to the composition of personal information items for each personal information medium 10. Therefore, the accuracy of combinations of printing personal information items can be increased.

In the present embodiment, one media sheet 15 is used to collectively produce different personal information media 10, and personal information is printed twice, once by the first printing unit 120 and once by the second printing unit 140, during production thereof. In such a configuration, management of combinations of personal information to be printed is important issue. According to the printing system 100 of the present embodiment, by establishing a correspondence between the first information group Gi1 and the second information group Gi2, which are printed separately, using the information group ID, the combinations of personal information are reliably managed; therefore, the accuracy of combinations of printed personal information items can be reliably increased.

According to the foregoing embodiment, the following advantageous effects are obtained:

(1) Based on the read information group IDs printed together with the first information group Gi1 and the correspondence between the information group ID and the first and second information groups Gi1 and Gi2, second data Dt2 is outputted for printing the second information group Gi2 according to the composition of personal information items for each personal information medium 10. Therefore, the accuracy of combinations of printing personal information items can be increased.

(2) Since the first printing unit 120 is provided with a plurality of head rows 20, the number of sheet bodies 19 printed per unit time by the first printing unit 120 can be increased by printing first personal information items Ip1 using the plurality of head rows 20. Because the speed of thermal transfer printing using the hologram ribbon 22 is lower than the speed of printing using a colored material of a laser printer and the like, the efficiency of producing the media sheet 15 can be reliably increased by increasing the number of sheet bodies 19 printed per unit time by the first printing unit 120.

(3) The head row 20 serving as the first head group prints at least one of the first personal information items Ip1 included in the first information group Gi1 and the information group ID, while the head row 20 serving as the second head group prints the remaining first personal information items Ip1 included in the second information group Gi1 and the information group ID. The position of the information group ID printed by the first head group is different from the position of the information group ID printed by the second head group.

According to the above configuration, even in a form in which a plurality of first personal information items Ip1 are separately printed by a plurality of head groups, by comparing the information group IDs printed by the head groups, it can be confirmed that the first personal information items Ip1 printed on one sheet body 19 are first personal information items Ip1 belonging to the same first information group Gi1, that is, first personal information items Ip1 to be included in one media sheet 15.

(4) As a step in the verification process, the identification information processing section 114 of the control apparatus 110 determines whether the information group ID printed by the first head group and the information group ID printed by the second head group match each other. In response to the identification information processing section 114 determining that the information group IDs printed by the first head group and the second head group match each other, the second data output section 113 outputs, to the second printing unit 140, second data Dt2 based on the second information group Gi2 that has been identified as the second information group Gi2 linked to the matched information group IDs.

According to the above configuration, it can be confirmed that the first personal information items Ip1 separately printed by the first head group and the second head group are first personal information items Ip1 belonging to the same first information group Gi1, that is, first personal information items Ip1 to be included in one media sheet 15. Since the second data Dt2 is outputted after the confirmation, the accuracy in forming the media sheet 15 can be improved.

(5) As a step in the verification process, the identification information processing section 114 determines whether the first information group Gi1 linked to the information group ID read from the sheet body 19 has been used for the first data Dt1 outputted to the first printing unit 120. In response to the identification information processing section 114 determining that the first information group Gi1 linked to the information group ID read from the sheet body 19 has been used for the first data Dt1 outputted to the first printing unit 120, the second data output section 113 outputs, to the second printing unit 140, second data Dt2 based on the second information group Gi2 that has been identified as the second information group Gi2 linked to the information group IDs above.

According to the above configuration, it can be confirmed that the sheet body 19 targeted for reading of the information group IDs is a sheet body 19 that has been delivered to the reading unit 130 by the correct procedure, that is, a sheet body 19 on which the first personal information items Ip1 have already been printed, and the second personal information items Ip2 are to be printed next. Since the second data Dt2 is outputted after the confirmation, the accuracy in forming the media sheet 15 can be improved.

(6) Each head row 20 of the first printing unit 120 is provided with a plurality of thermal heads 21, and the plurality of thermal heads 21 of each head row 20 are arranged so that the thermal heads 21 correspond to the respective medium regions 16 constituting the medium region row 17.

According to the above configuration, the individual thermal heads 21 perform printing on the respective medium regions 16 constituting the medium region row 17. This enables the use of a hologram ribbon 22 having a small width similar to the width of the medium region 16. As a result of the printing being performed with hologram ribbons 22 having such a small width provided for the respective thermal heads 21, unnecessary consumption of the hologram ribbon 22 in portions corresponding to the space between adjacent medium regions 16 is prevented.

In a form where a plurality of personal information media 10 are collectively produced using one media sheet 15, even if only a small amount of the hologram ribbon 22 is wasted in producing one personal information medium 10, overall the amount of hologram ribbon 22 unnecessarily consumed becomes enormous. Consequently, by adopting the above configuration, the amount of the hologram ribbons 22 used when producing a large number of personal information media 10 can be suitably reduced, and the effect of reducing the amount of the hologram ribbons 22 used can be more significantly obtained.

(7) The ribbon transport module 124 of the first printing unit 120 is configured to transport a hologram ribbon 22 having a width Wr greater than the length Ws of the row of resistive heating elements provided in the thermal head 21. This configuration prevents the resistor row 21a from making contact with the sheet body 19 outside the hologram ribbon 22 when the hologram ribbon 22 is transferred. Thus, the formation of scratches on the sheet body 19 is prevented.

Furthermore, in a form where the ribbon transport module 124 transports a hologram ribbon 22 having a width Wr greater than the width Wh of entire the thermal head 21, the edge of the thermal head 21 is prevented from making contact with the sheet body 19 outside the hologram ribbon 22. This also prevents the formation of scratches on the sheet body 19.

(8) Each thermal head 21 includes a controller that controls energization of the resistive heating elements in the thermal head 21. The controller converts the image data in the first data Dt1 that corresponds to one medium region 16 into data for forming a color image using dots exhibiting structural color, and controls the energization based on the converted data. As a result, the thermal head 21 thermally transfers the dots from the hologram ribbon 22 onto the sheet body 19.

Compared with a configuration in which one thermal head 21 collectively prints on a plurality of medium regions 16, the above configuration reduces the size of the region printed on by one thermal head 21, that is, the size of the region requiring data conversion for one thermal head 21. Consequently, the above configuration shortens the time required for data conversion, thereby increasing the number of sheet bodies 19 printed per unit time by the first printing unit 120.

(9) The reading unit 130, which reads the information group IDs from the sheet body 19, is provided separately from the first printing unit 120 and the second printing unit 140, which perform printing. Consequently, compared with the case where a reading unit that reads the information group ID is provided in a unit that performs printing, the configuration of a unit that performs printing is simplified. Therefore, for example, the first printing unit 120 and the second printing unit 140 can be configured by making minor improvements to a conventionally used printing mechanism.

(10) The first personal information item Ip1 and the second personal information item Ip2 each include a facial image, and the thermal head 21 prints the facial image. The personal information medium 10 having such a combination of items of personal information has a strong anti-counterfeiting effect. Further, because the accuracy is improved in the combination of items of personal information printed when producing the personal information medium 10 having a strong anti-counterfeiting effect, the printing system 100 is highly useful.

[Modifications]

The above embodiment can be implemented with modifications as described below.

The media sheet 15 needs to have a plurality of medium regions 16, but the arrangement of the medium regions 16 is not particularly limited. The number of medium region rows 17 included in the media sheet 15 and the number of medium regions 16 constituting one medium region row 17 may be different from those in the above embodiment.

The number and arrangement of the thermal heads 21 included in the first printing unit 120 may be different from those in the above embodiment. For example, the first printing unit 120 may include one head row 20, and this head row 20 may print on all of the medium region rows 17. Furthermore, one thermal head 21 may print on the plurality of medium regions 16 constituting a medium region row 17.

The first printing unit 120 may print only one information group ID or print three or more information group IDs regardless of the number of head rows 20 and the arrangement of thermal heads 21.

The identification information processing section 114 of the control apparatus 110 may at least identify the second information group Gi2 linked to the information group ID read from the sheet body 19, and it does not have to perform other steps included in the verification process of the embodiment above.

The information group ID is not limited to a string of letters or numbers as long as it is recognizable by image analysis or optical reading. The information group ID may be printed in the form of code such as barcode. The reading mechanism 132 of the reading unit 130 needs to be configured to read the information group ID according to the format thereof. If the information group ID is printed as a string of letters or numbers, the user of the printing system 100 can visually read the information group ID. Therefore, for example, when a media sheet 15 is to be reissued due to poor formation of the media sheet 15, the media sheet 15 to be reissued can be specified using the information group ID read by a user.

The structural color portion 12 does not have to be a portion in which a hologram is formed as long as it can be formed using a printing method. For example, the structural color portion 12 may be a region to which a transfer layer is transferred which exhibits structural color based on a different principle from that of hologram, or may be a region formed by applying ink containing a pearl pigment. The printing method used by the first printing unit 120 is not limited as long as the first printing unit 120 is configured to perform printing using a material exhibiting structural color.

The first personal information item Ip1 and the second personal information item Ip2 may each be personal information different from a facial image. Further, the first personal information item Ip1 and the second personal information item Ip2 may each be printed in a single color.

The first printing unit 120 may print the first personal information items Ip1 and the information group IDs using a material that includes pigment, while the second printing unit 140 may print the second personal information items Ip2 using a material that exhibits structural color. That is, printing of the personal information items using a material that exhibits structural color may be performed after printing of the personal information items using a material that includes pigment. In this case, the first data Dt1 outputted by the control apparatus 110 to the first printing unit 120 is data for printing each first personal information item Ip1 of the first information group Gi1 in a different medium region 16 and for printing an information group ID that has been linked to the first information group Gi1 outside the medium regions 16. The first printing unit 120 performs printing based on the first data Dt1. The reading unit 130 is configured to read from the sheet body 19 the information group ID printed using a material that includes pigment, and the second information group Gi2 linked to the read information group ID is identified by the control apparatus 110. Further, the second data Dt2 outputted by the control apparatus 110 to the second printing unit 140 is data for printing the second personal information items Ip2 of the identified second information group Gi2 on the corresponding respective medium regions 16 on which the first personal information items Ip1 linked to the respective second personal information items Ip2 have been printed. The second printing unit 140 performs printing based on the second data Dt2.

The reading unit 130 may be omitted, and either the first printing unit 120 or the second printing unit 140 may be provided with a function of reading the information group ID. Further, the sheet body 19 may be delivered from the first printing unit 120 to the second printing unit 140.

The personal information medium 10 is not limited to being a card shape as long as it can be formed using imposition, and may be a book such as a passport. The medium regions 16 of the media sheet 15 may correspond to part or all of the respective personal information media 10, and the medium regions 16 may serve as a component of the respective personal information media 10.

The control apparatus 110 is not limited to being an apparatus that performs all the processes by software. For example, the control apparatus 110 may include a dedicated hardware circuit (for example, an application-specific integrated circuit, or ASIC) that performs hardware processing for at least some of the processes performed by the apparatus. That is, the control apparatus 110 may be configured as circuitry that includes: (1) one or more processors that operate according to a computer program (software); (2) one or more dedicated hardware circuits that execute at least some of various processes; or (3) a combination of these. The processor may include a CPU and a memory, such as a RAM and a ROM, and the memory may store program codes or instructions that are configured to cause the CPU to perform processes. The memory, which is a computer-readable medium, may be any usable medium that is accessible by a general purpose or dedicated computer.

[Reference Signs List] Dt1 . . . First data; Dt2 . . . Second data; Gi1 . . . First information group; Gi2 . . . Second information group; Ip1 . . . First personal information; Ip2 Second personal information; 10 . . . Personal information medium; 11 . . . Support; 12 . . . Structural color portion; 13 . . . Pigmented portion; 14 . . . Substrate sheet; 15 . . . Media sheet; 16 . . . Medium region; 17 . . . Medium region row; 18 . . . ID portion; 19 . . . Sheet body; 20 . . . Head row; 21 . . . Thermal head; 21a . . . Resistor row; 22 . . . Hologram ribbon; 30 . . . Platen roller; 100 . . . Printing system; 110 . . . Control apparatus; 111 . . . Central processing unit; 112 . . . First data output section; 113 . . . Second data output section; 114 . . . Identification information processing section; 115 . . . Storage unit; 120 . . . First printing unit; 130 . . . Reading unit; 140 . . . Second printing unit.

What is claimed is:

1. A printing system for producing a media sheet, the media sheet having a plurality of medium regions, each of the medium regions corresponding to a different one of separate personal information media, each of the personal information media including a first personal information item and a second personal information item corresponding to each other, the printing system comprising:
   a first printing unit that performs printing using a material that exhibits structural color, based on first data;
   a second printing unit that performs printing using a material that includes pigment, based on second data; and
   a control apparatus that outputs the first data and the second data,
   wherein
   the control apparatus includes
   a storage unit that stores first information groups and second information groups, each of the first information groups and a corresponding one of the second information groups being linked to an item of identification information, each of the first information groups consisting of all first personal information items to be included in the medium sheet, each of the second information groups consisting of all second personal information items to be included in the medium sheet, the storage unit being configured to make, for the respective personal information mediums, a correspondence between a corresponding one of the first personal information items of each of the first information groups and a corresponding one of the second personal information items of a corresponding one of the second information groups, a first data output section that outputs the first data to the first printing unit, the first data causing the first printing unit to:

print the first personal information items in a selected one of the first information groups on the corresponding respective medium regions of the media sheet; and print the item of identification information linked to the selected one of the first information groups on a region of the media sheet except for the medium regions, an identification information processing section that identifies one of the second information groups, the one of the second information groups being linked to the item of identification information read from the media sheet on which the printing based on the first data has been performed, and a second data output section that outputs the second data to the second printing unit, the second data causing the second printing unit to print the second personal information items included in the identified one of the second information groups on the corresponding respective medium regions on which the first personal information items corresponding to the respective second personal information items have been printed.

2. The printing system of claim 1, further comprising a reading unit that receives the media sheet on which the first printing unit has printed, reads the item of identification information from the media sheet, and passes the media sheet to the second printing unit.

3. The printing system of claim 1, wherein the first printing unit includes a first head group and a second head group, each of the first and second head groups being comprised of one or more thermal heads, and the first printing unit is configured to, based on the first data:

use the first head group to print at least one of the first personal information items included in the selected one of the first information groups and print the item of identification information linked to the selected one of the first information groups in a first position of the medium sheet; and use the second head group to print a remainder of the first personal information items included in the selected one of the first information groups and print the item of identification information linked to the selected one of the first information groups in a second position of the medium sheet, the first position of the medium sheet being different from the second position of the medium sheet.

4. The printing system of claim 3, wherein the identification information processing section is configured to determine whether the item of identification information printed by the first head group and the item of identification information printed by the second head group match each other, and the second data output section is configured to output, to the second printing unit, the second data corresponding to the identified one of the second information groups in response to the identification information processing section determining that the item of identification information printed by the first head group and the item of identification information printed by the second head group match each other.

5. The printing system of claim 1, wherein the identification information processing section is configured to determine whether the selected one of the first information groups, to which the read item of identification information is linked, has been used for the first data outputted to the first printing unit, and the second data output section is configured to output, to the second printing unit, the second data corresponding to the identified one of the second information groups in response to the identification information processing section determining that the selected one of the first information groups, to which the read item of identification information is linked, has been used for the first data outputted to the first printing unit.

6. The printing system of claim 1, wherein each of the first personal information items and the second personal information items includes a facial image.

7. A printing system for producing a media sheet, the media sheet having a plurality of medium regions, each of the medium regions corresponding to a different one of separate personal information media, each of the personal information media including a first personal information item and a second personal information item corresponding to each other, the printing system comprising:

a first printing unit that performs printing using a material that includes pigment, based on first data;

a second printing unit that performs printing using a material that exhibits structural color, based on second data; and a control apparatus that outputs the first data and the second data, wherein the control apparatus includes a storage unit that stores first information groups and second information groups, each of the first information groups and a corresponding one of the second information groups being linked to an item of identification information, each of the first information groups consisting of all first personal information items to be included in the medium sheet, each of the second information groups consisting of all second personal information items to be included in the medium sheet, the storage unit being configured to make, for the respective personal information mediums, a correspondence between a corresponding one of the first personal information items of each of the first information groups and a corresponding one of the second personal information items of a corresponding one of the second information groups, a first data output section that outputs the first data to the first printing unit, the first data causing the first printing unit to:

print the first personal information items in a selected one of the first information groups on the corresponding respective medium regions of the media sheet; and print the item of identification information linked to the selected one of the first information groups on a region of the media sheet except for the medium regions, an identification information processing section that identifies one of the second information groups, the one of the second information groups being linked to the item of identification information read from the media sheet on which the printing based on the first data has been performed, and a second data output section that outputs the second data to the second printing unit, the second data causing the second printing unit to print the second personal information items included in the identified one of the second information groups on the corresponding respective medium regions on which the first personal information items corresponding to the respective second personal information items have been printed.

8. A printing control apparatus for producing a media sheet, the media sheet having a plurality of medium regions, each of the medium regions corresponding to a different one of separate personal information media, each of the personal information media including a first personal information item and a second personal information item corresponding to each other, the printing control apparatus comprising:

a storage unit that stores first information groups and second information groups, each of the first information groups and a corresponding one of the second information groups being linked to an item of identification information, each of the first information groups consisting of all first personal information items to be included in the medium sheet, each of the second information groups consisting of all second personal information items to be included in the medium sheet, the storage unit being configured to make, for the respective personal information mediums, a correspondence between a corresponding one of the first personal information items of each of the first information groups and a corresponding one of the second personal information items of a corresponding one of the second information groups, a first data output section that outputs first data to a first printing unit that performs printing using a material that exhibits structural color, based on the first data, the first data causing the first printing unit to:

print the first personal information items in a selected one of the first information groups on the corresponding respective medium regions of the media sheet; and print the item of identification information linked to the selected one of the first information groups on a region of the media sheet except for the medium regions, an identification information processing section that identifies one of the second information groups, the one of the second information groups being linked to the item of identification information read from the media sheet on which the printing based on the first data has been performed, and a second data output section that outputs second data to a second printing unit that performs printing using a material that includes pigment, based on the second data, the second data causing the second printing unit to print the second personal information items included in the identified one of the second information groups on the corresponding respective medium regions on which the first personal information items corresponding to the respective second personal information items have been printed.

\* \* \* \* \*